US011328142B2

(12) United States Patent
Rodriguez Ortiz et al.

(10) Patent No.: US 11,328,142 B2
(45) Date of Patent: *May 10, 2022

(54) HYBRID ILLUMINATION SYSTEM FOR SYMBOLOGY READERS AND METHOD OF READING DPM CODES THEREWITH

(71) Applicant: ZEBRA TECHNOLOGIES CORPORATION, Lincolnshire, IL (US)

(72) Inventors: Miguel Orlando Rodriguez Ortiz, Coram, NY (US); Igor Vinogradov, Oakdale, NY (US); Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,412

(22) Filed: Apr. 19, 2021

(65) Prior Publication Data
US 2021/0240952 A1 Aug. 5, 2021

Related U.S. Application Data

(63) Continuation of application No. 16/457,521, filed on Jun. 28, 2019, now Pat. No. 10,984,204.

(51) Int. Cl.
*G06K 7/10* (2006.01)
*G06K 7/14* (2006.01)

(52) U.S. Cl.
CPC ..... *G06K 7/10881* (2013.01); *G06K 7/10722* (2013.01); *G06K 7/1417* (2013.01); *G06K 2007/10524* (2013.01)

(58) Field of Classification Search
None
See application file for complete search history.

(56) References Cited

U.S. PATENT DOCUMENTS

| | | | |
|---|---|---|---|
| 6,029,893 A | 2/2000 | Tan et al. | |
| 6,595,422 B1 * | 7/2003 | Doljack | G06K 7/10722 235/462.42 |
| 7,232,072 B1 | 6/2007 | Bunte et al. | |

(Continued)

OTHER PUBLICATIONS

International Search Report and Written Opinion for International Application No. PCT/US2020/036397 dated Aug. 20, 2020.

*Primary Examiner* — Kristy A Haupt
(74) *Attorney, Agent, or Firm* — Yuri Astvatsaturov

(57) ABSTRACT

Symbology readers and methods of reading DPM codes on objects therewith are provided. The symbology reader include a housing that defines a cavity having a first portion and a second portion. A window that separates the first portion and the second portion of the cavity is positioned within the cavity. The symbology reader includes a diffuser configured to diffusingly reflect light that impinges thereon positioned within the first portion of the cavity. The symbology reader includes an imaging assembly and a first illumination assembly positioned within the second portion of the cavity. The symbology reader includes an optical element configured to direct illumination light to impinge upon the diffuser.

29 Claims, 19 Drawing Sheets

(56) References Cited

U.S. PATENT DOCUMENTS

| | | | |
|---|---|---|---|
| 9,286,502 B1* | 3/2016 | Ashby | G06K 7/10752 |
| 10,984,204 B2* | 4/2021 | Rodriguez Ortiz | G06K 7/1417 |
| 2016/0245478 A1* | 8/2016 | Hoffmann | G02B 27/0911 |
| 2017/0330008 A1* | 11/2017 | Suman | G06K 19/06037 |

* cited by examiner

HYBRID ILLUMINATION SYSTEM FOR SYMBOLOGY READERS AND METHOD OF READING DPM CODES THEREWITH

RELATED APPLICATIONS

This is a Continuation application of U.S. patent application Ser. No. 16/457,521, filed on Jun. 28, 2019, and incorporated herein by reference in its entirety.

BACKGROUND

Existing symbology readers include a single imaging assembly configured to read a particular type of code. For example, one symbology reader may include an imaging assembly optimized to read barcodes printed on packaging; another symbology reader may include an imaging assembly optimized to read codes presented on a digital screen; yet another symbology reader may include an imaging assembly optimized to read direct part marking (DPM) codes. However, in some environments, the ability to read multiple types of code is required. Traditionally, one would have to carry around and switch between multiple symbology readers to read the different types of codes. However, the different types of codes may be more easily read under different illumination conditions. Accordingly, there is a need for hybrid illumination systems for symbology readers and methods of reading DPM codes therewith.

SUMMARY

Embodiments of the present disclosure include a symbology reader comprising a housing that defines a cavity having a first portion and a second portion. The first portion of the cavity may be further defined by one or more walls. The apparatus also includes a window positioned within the cavity. The window separates the first portion of the cavity and the second portion of the cavity. The apparatus also includes a diffuser positioned within the first portion of the cavity. The diffuser is configured to diffusingly reflect light that impinges thereon (e.g., by scattering the light that impinges thereon). The apparatus also includes an imaging assembly positioned within the second portion of the cavity and configured to capture light from an imaging field of view (FOV) extending through the window and the first portion of the cavity and a first illumination assembly positioned within the second portion of the cavity and configured to emit a first illumination light towards the window. The apparatus may also include a first optical element configured to direct a first amount of a total amount of the first illumination light to exit the window and impinge on the diffuser.

Additional embodiments of the present disclosure include a symbology reader comprising a housing that defines a cavity having a first portion and a second portion. The first portion of the cavity is further defined by one or more walls. The symbology reader includes a diffuser positioned within the first portion of the cavity. The diffuser is configured to diffusingly reflect light that impinges thereon. The symbology reader also includes an imaging assembly positioned within the second portion of the cavity and configured to capture light from an imaging field of view (FOV) extending through the cavity of the housing. Additionally, the symbology reader includes a first illumination assembly positioned within the first portion of the cavity. The first illumination assembly is configured to indirectly illuminate a DPM code and emit light towards an optical element configured to redirect at least some of the light emitted by an illumination source of the first illumination assembly toward the diffuser. The diffuser further scatters the at least some light towards the DPM code thereby indirectly illuminating the DPM code. The symbology reader also includes a second illumination assembly configured to directly illuminate a barcode.

Further additional embodiments of the present disclosure include a method of reading direct part marking (DPM) codes by a scanner having (i) a housing that defines a cavity having a first portion and a second portion, the first portion of the cavity being further defined by one or more walls; (ii) a window positioned within the cavity, wherein the window separates the first portion of the cavity and the second portion of the cavity; (iii) a diffuser positioned within the first portion of the cavity, the diffuser configured to diffusingly reflect light that impinges thereon; (iv) an imaging assembly positioned within the second portion of the cavity and configured to capture light from an imaging field of view (FOV) extending through the window and the first portion of the cavity; (v) a first illumination assembly positioned within the second portion of the cavity and configured to emit a first illumination light towards the window; and (vi) an optical element configured to direct a first amount of a total amount of the first illumination light to exit the window and impinge on the diffuser. The method includes capturing a set of image data by the imaging assembly and detecting, by one or more processors, a direct part marking (DPM) code within the FOV of the imaging assembly. The method also includes decoding, by the one or more processors, the DPM code by analyzing a set of image data representative of the DPM code.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
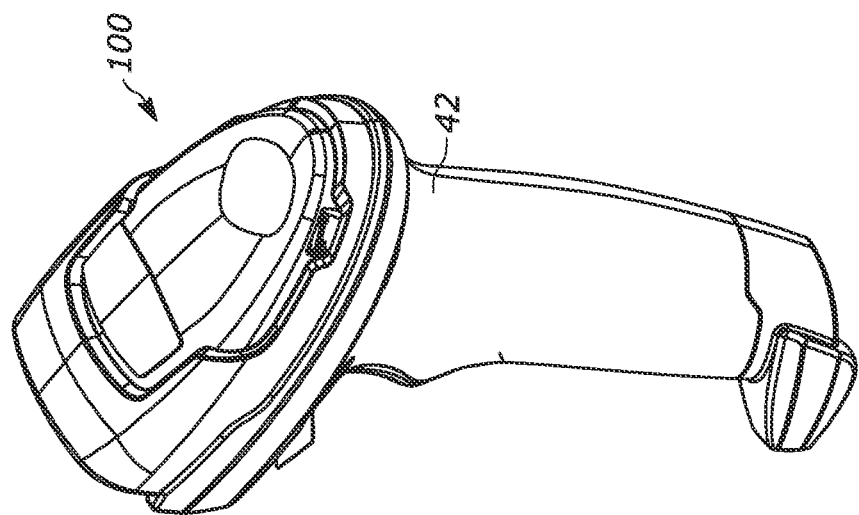
FIG. 1A illustrates front and rear perspective views of a symbology reader, in accordance with an embodiment of the present invention.
Figure 1A:
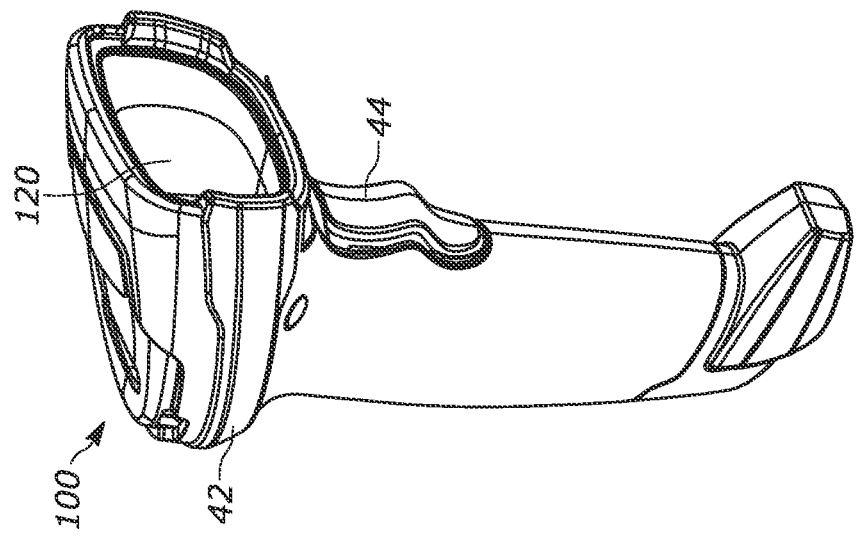

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Referring to FIG. 1A, shown therein is an exemplary symbology reader 100 having a housing 42 with a cavity for housing internal components, a trigger 44, and a window 120. The symbology reader 100 can be used in a hands-free mode as a stationary workstation when it is placed on the countertop in a supporting cradle (not shown). The symbology reader 100 can also be used in a handheld mode when it is picked up off the countertop (or any other surface) and held in an operator's hand. In the hands-free mode, products can be slid, swiped past, or presented to the window 120. In the handheld mode, the barcode reader 120 can be aimed at a barcode on a product, and the trigger 44 can be manually depressed to initiate imaging of the barcode. In some implementations, the supporting cradle can be omitted, and the housing 42 can also be in other handheld or non-handheld shapes.

Figure 1B:
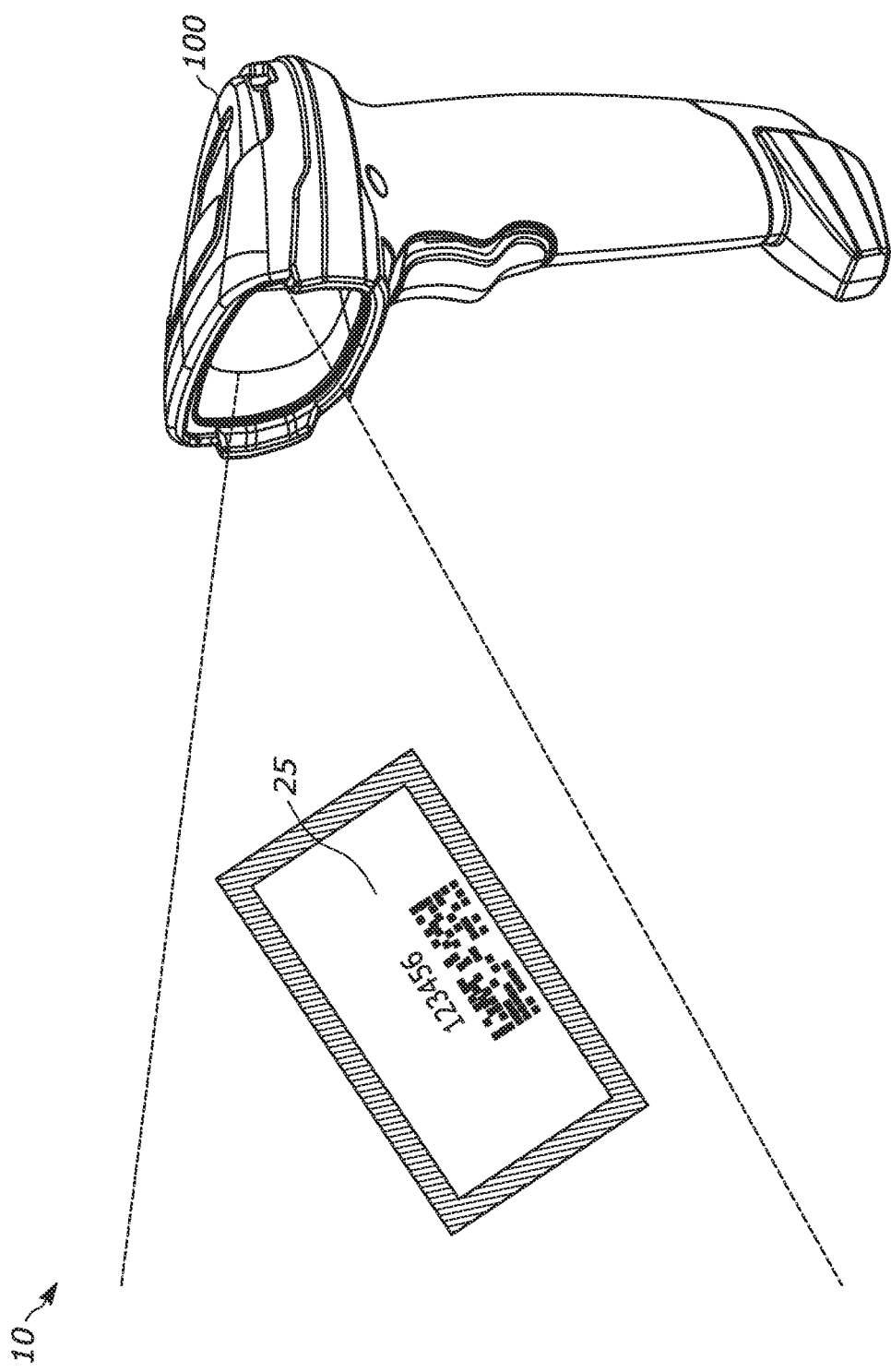
FIGS. 1B and 1C are example environments where the symbology reader of FIG. 1A is used to read a DPM code and a barcode, respectively, in accordance with an example.

Referring now to FIG. 1B, illustrated is an example environment 10 where the symbology reader 100 is used to read a DPM code 25. The DPM code 25 may encode information using a one-dimensional, two-dimensional pattern, and/or three-dimensional pattern. Accordingly, the DPM code 25 may be encoded using a pattern of topographical indications (e.g., varying the height of the object surface such as by removing or displacing material of the object, such as by use of a dot peen) or using a pattern of textural indications (e.g., using ablation techniques to cause some portions of the object to be rough and other portions of the object to be smooth). Generally, the DPM code 25 encodes information about an object on which the DPM code 25 resides, such as serial number, a part number, or another identifier of the object, a manufacturing date and/or location of the object, and/or a manufacturer of the object.

Due to the pattern of the DPM code 25 being encoded directly into the object, the DPM code 25 preferably is illuminated at an off-axis angle using diffuse light to be able to detect the pattern (or the shadows and/or reflections caused by the pattern). In some embodiments, the diffuse light impinging on the DPM code 25 may include off-axis angles between about 30° and 50°. In other embodiments, the diffuse light may include off-axis angles between about 20° and 60°. By providing off-axis, diffuse illumination, the specular reflection associated with surfaces subjected to direct illumination is mitigated, thereby improving the ability of the symbology reader 100 to detect the DPM code 25. In scenarios where the DPM code 25 is encoded using textural patterns, the reflective, non-rough sections of the DPM code 25 may be particularly susceptible to producing specular reflections that inhibit the ability of the symbology reader 100 to detect the DPM code 25. That said, the off-axis diffuse illumination may still improve the ability of the symbology reader to decode the DPM code 25 when other DPM encoding techniques are used (or with barcodes printed on reflective surfaces).

Figure 1C:
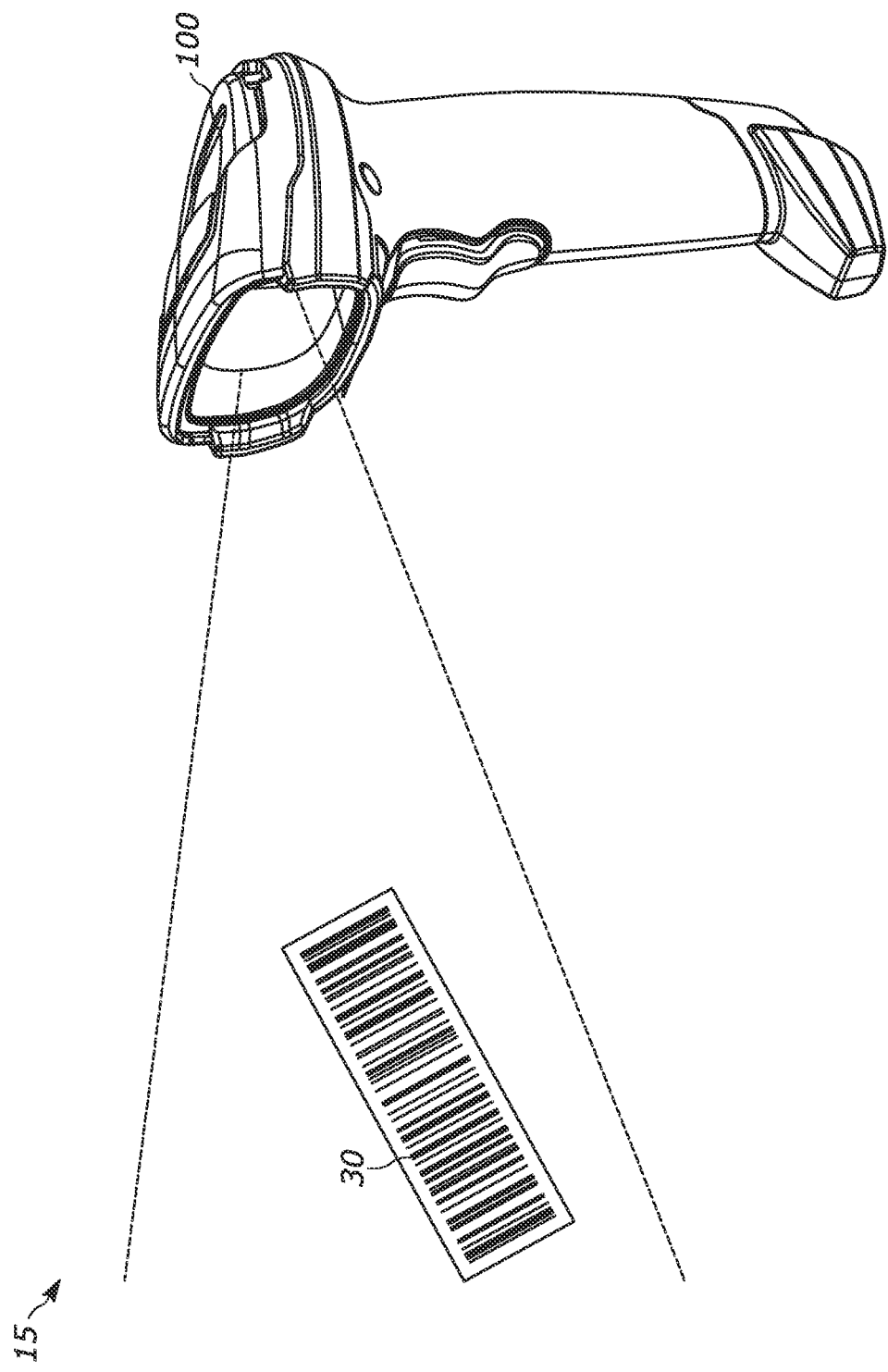

Referring now to FIG. 1C, illustrated is an example environment 15 where the symbology reader 100 is used to read a barcode code 30. The illustrated barcode 30 is not associated with specular reflections that inhibit the ability of the symbology reader 100 to decode the barcode 30. Accordingly, the symbology reader 100 may be configured to provide direct illumination when attempting to read the barcode 30.

It should be appreciated that the symbology reader 100 is (in the currently described embodiment) a dual mode reader capable of providing both an off-axis diffuse illumination light to read the DPM code 25 and direct illumination light to read the barcode 30. Accordingly, the symbology reader 100 includes a imaging assembly to detect reflected light when the symbology reader 100 is configured to provide the off-axis diffuse illumination light or the direct illumination light. In some embodiments, the imaging assembly includes two sets of image components respectively configured to detect reflected light when the off-axis diffuse illumination light is enabled and when the direct illumination light is enabled.

Figure 2A:
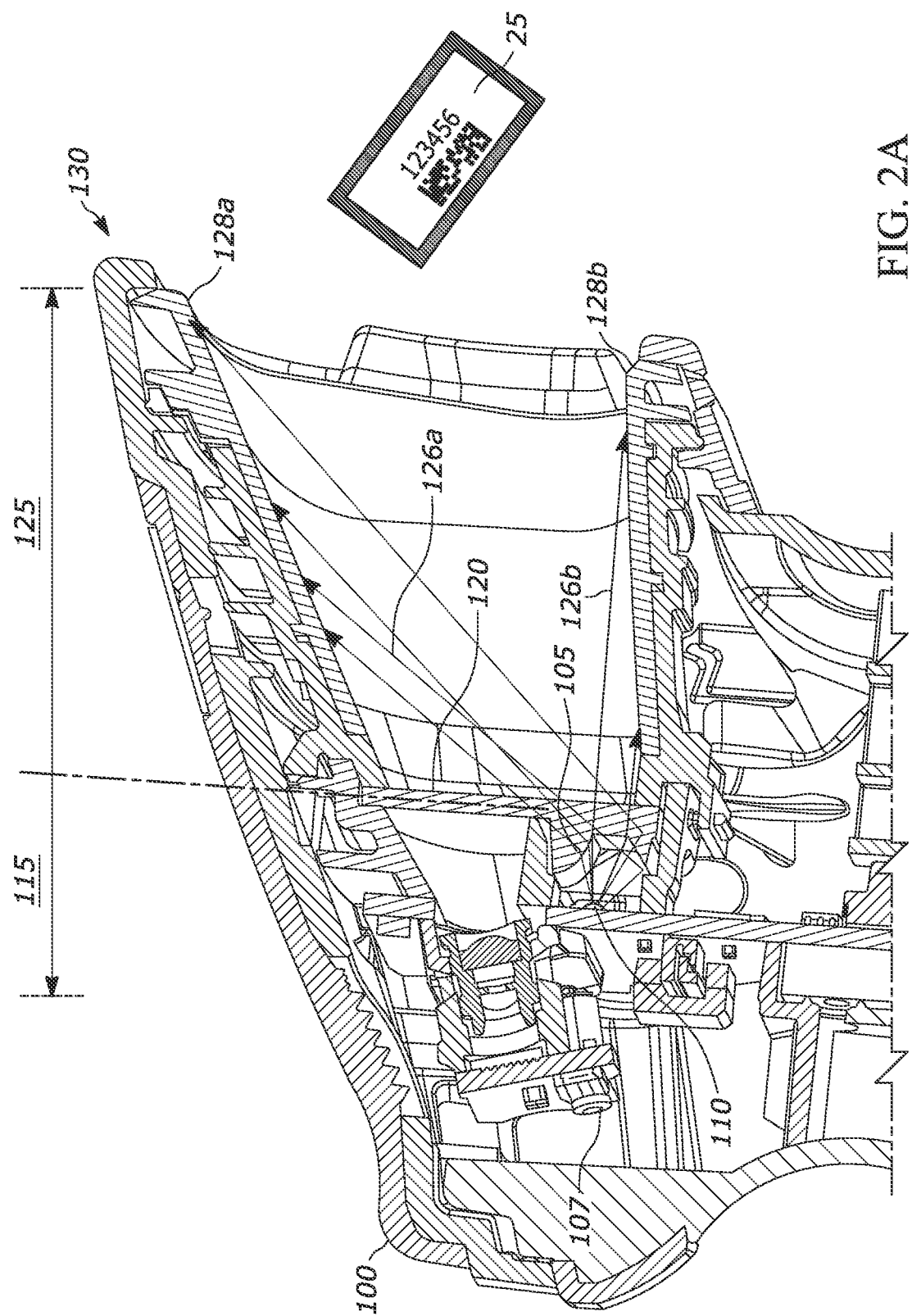
FIG. 2A is an exploded view of a housing of the symbology reader of FIG. 1 illustrating an optical path for light produced by an illumination assembly configured to produce diffuse illumination.

FIG. 2A is an exploded view of a housing of the symbology reader 100 of FIG. 1 illustrating an optical path 126 for light produced by an illumination assembly 110 configured to produce diffuse illumination light. As illustrated, the housing includes a window 120 that divides a cavity of the housing into two portions: a first portion 125 extending forward from the window 120 towards a nose 130 of the housing; and a second portion 115 extending rearward from the window 120 towards an illumination assembly 110.

The first portion 125 of the cavity includes a diffuser 128 configured to diffusingly reflect light that impinges upon the diffuser 128 towards the DPM code 25. In the illustrated example, the diffuser 128 includes an upper diffuser 128a that lines an upper wall of the first portion 125 and a lower diffuser 128b that lines a lower wall of the first portion 125. It should be appreciated that while FIG. 2A depicts the diffuser 128 as being substantially horizontal, the diffuser 128 may be contoured to the frustum (or any other shape) of the interior of the housing. Further, while FIG. 2A depicts an embodiment where the diffuser 128 includes the upper diffuser 128a and the lower diffuser 128b may line a single wall of the portion 125, multiple walls of the first portion 125, or all of the walls of the first portion 125.

To produce a diffuse reflection, the diffuser 128 generally has a textured surface that causes the illumination light that impinges thereupon to scatter at a plurality of different angles. For example, the diffuser 128 may include microstructures that, in aggregate, are generally smooth to human touch, but nonetheless provide a diverse range of reflection angles to diffusingly scatter the reflected light that impinged thereon. In some embodiments, to improve the reflectivity of the diffuser 128, the diffuser 128 is substantially white. As it is generally used herein, "white" may be defined in terms of the RGB color model where each of the red, green, and blue components are within a threshold value (e.g., 10%) of one another and wherein each of the red, green, and blue components have a value over 225. In some embodiments, the diffuser 128 is configured to reflects and/or scatters light substantially uniformly over multiple wavelengths, including light in the visible, ultraviolet, and/or infrared spectra. It should be understood such that in other embodiments the diffuser 128 can be any color or pigment that is particular adapted for reflecting light of particular wavelengths. For example, it may be preferable for the diffuser 128 to have a substantially red color in instances where the illumination assembly 110 emits red illumination light.

In the embodiment illustrated in FIG. 2A, the diffuser 128 is a bezel or ring that lines the first portion 125. Accordingly, the diffuser 128 may be positioned proximate to the nose 130. For example, the diffuser 128 may be positioned at circumference of the housing at least 75% of the length of the first cavity 125 extending from window 120. In various embodiments, the diffuser 128 may line different portions of the first cavity 125. For example, the diffuser 128 may line the entire length of the first cavity 125, up to 75% of the length of the first cavity 125, up to 50% of the length of the first cavity 125, or even 10% or smaller.

Turning to the second portion 115 of the housing, the symbology reader 100 includes an imaging assembly 107 configured to capture light from within an imaging field of view (FOV) extending through the window 120 and the first portion 125. The second portion 115 also includes the illumination assembly 110 configured to emit light toward the window 120. The path of the illumination light emitted by the illumination assembly 110 is represented by the optical path 126. As illustrated, the optical path 126 includes a plurality of component rays emitted by the illumination assembly 110 traversing respective paths through the housing. It should be appreciated that for ease of explanation, not all rays of light emitted by the illumination assembly 110 are illustrated. The symbology reader 100 includes an optical element 105 disposed within the optical path 126 configured to direct the illumination light towards the diffuser 128. As illustrated, the optical element 105 may divide the optical path 126 into an upper optical path 126a directed at the upper diffuser 128a and a lower optical path 126b direct at the lower diffuser 128b. In some embodiments, the illumination assembly 110 produces an illumination field aimed to pass through the first portion 125 without impinging upon the diffuser 128 but for the presence of the optical element 105. While FIG. 2A illustrates the upper optical path 126a being directed toward the upper diffuser 128a, in other embodiments, the upper optical path 126a may reflect off an upper wall of the housing while being directed to the lower diffuser 128b. Similarly, in these embodiments, the lower optical path 126b may reflect off a lower wall of the housing while being directed to the upper diffuser 128a.

It should be appreciated that while FIG. 2A illustrates the optical element 105 as being disposed within the second portion 115, the optical element 105 may reside elsewhere along the optical path 126. For example, the optical element 105 may reside in the first portion 125 (e.g., the optical element 105 is affixed to an opposite surface of the window 120). As another example, the optical element 105 may include multiple discrete components wherein a first component (e.g., a lens) is disposed within the second portion 115 and a second component (e.g., an obscurator) is disposed within the first portion 125.

While FIG. 2A illustrates the optical element 105 being configured to direct the entirety of the illumination light produced by the illumination assembly 110 to impinge upon the diffuser 128, this may not be possible, or desirable, in all implementations. To this end, as long as at least half of the illumination light emitted by the illumination assembly 110 impinges upon the diffuser, there is a sufficient amount of off-axis illumination to be able to readily detect and/or decode a DPM code within the FOV of the imaging sensor 107. Additionally, the illumination assembly 110 may produce a wide illumination field such that some of the illumination (in most cases not intentionally) is not directed at optical element 105. Accordingly, for this portion of the illumination field, the illumination light does not interact with the optical element 105 at an angle that enables the optical element 105 to direct the illumination light toward the diffuser 128. Similarly, the optical element 105 may not be an ideal optical element capable of directing all of the light emitted by the illumination assembly 110 toward the diffuser 128. Consequently, when the illumination assembly 110 is enabled, the optical element 105 may be configured to direct at least 50% of the illumination light to impinge upon the diffuser 128. Said another way, the ratio of light that ratio of the illumination light that exits the window 120 and impinges on the diffuser 128 and the illumination light that exits the window 120 and passes through the first portion of the cavity without impinging on the one or more walls is greater than or equal to 1:1.

Figure 2B:
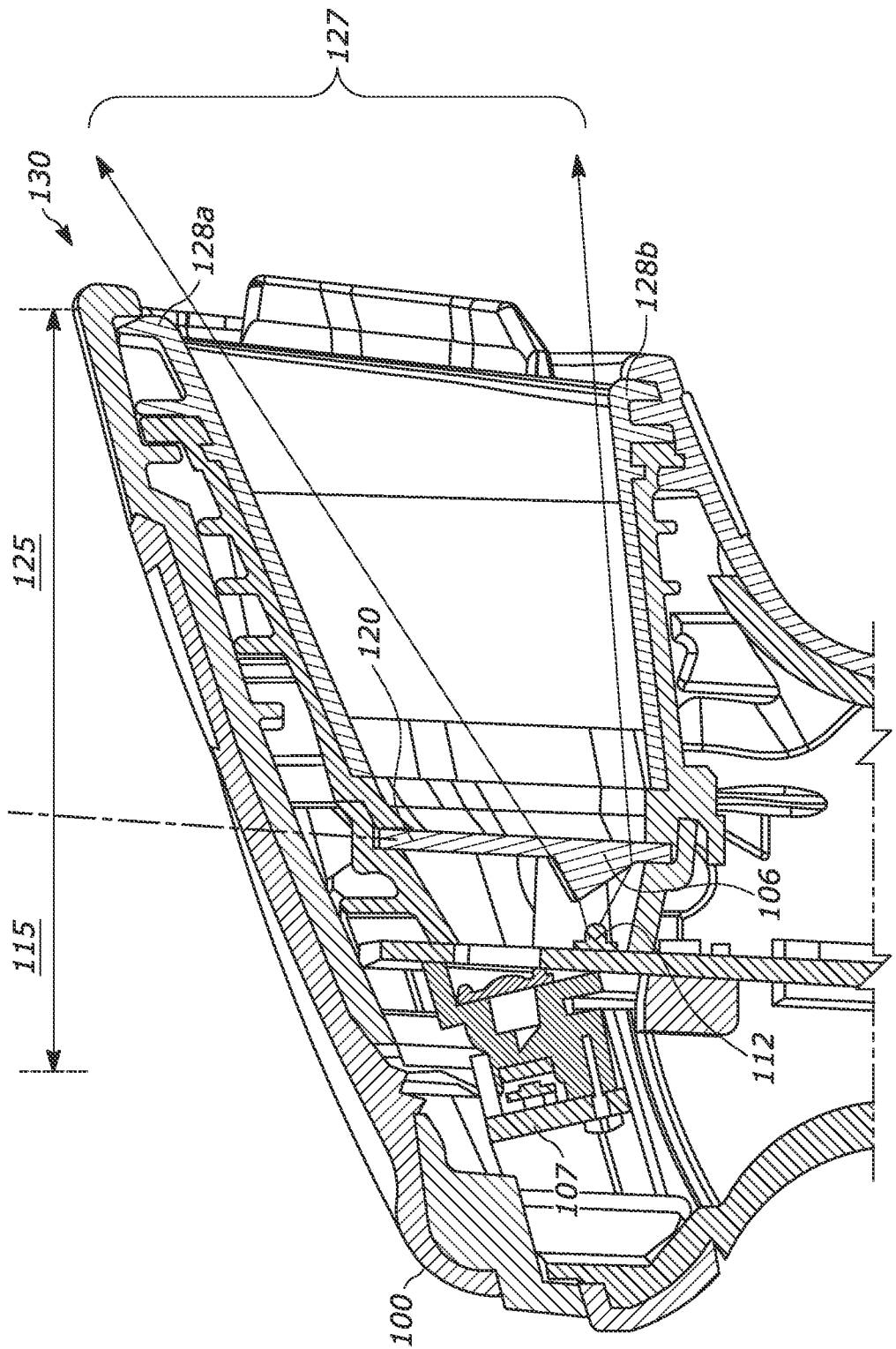
FIG. 2B is an exploded view of a housing of the symbology reader of FIG. 1 illustrating an optical path for light produced by an illumination assembly configured to produce direct illumination.

FIG. 2B is an exploded view of a housing of the symbology reader 100 of FIG. 1 illustrating an optical path 127 for light produced by an illumination assembly 112 configured to produce direct illumination light. As illustrated, the optical path 127 includes a plurality of component rays emitted by the illumination assembly 112 traversing respective paths through the housing. It should be appreciated that for ease of explanation, not all rays of light emitted by the illumination assembly 110 are illustrated. In the illustrated embodiment, the illumination assembly 112 is disposed within the second portion 115 and configured to produce an illumination light along an optical path 127 toward the window 120. An optical element 106 is configured to direct the illumination light produced by the illumination assembly 112 to pass through the first portion 125 without impinging on the one or more walls and/or the diffuser 128 thereon.

While FIG. 2B illustrates the optical element 106 being configured to direct the entirety of the illumination light produced by the illumination assembly 112 to pass through the first portion 125 without impinging upon the diffuser 128, this may not be possible, or desirable, in all implementations. For example, the illumination assembly 112 may produce a wide illumination field such that some of the illumination field is not directed at the optical element 106. Accordingly, for this portion of the illumination field, the illumination (in most cases not intentionally) does not interact with the optical element 106 at an angle that enables the optical element 106 to direct the illumination light to pass through the first portion 125 without substantially impinging upon the diffuser 128. Similarly, the optical element 106 may not be an ideal optical element capable of directing all of the light emitted by the illumination assembly 112 away from the diffuser 128. Consequently, when the illumination assembly 112 is enabled, the optical element 106 may be configured to direct at least 70% of the illumination light to pass through the first portion 125 without impinging upon the diffuser 128.

It should be appreciated that while FIGS. 2A-2B illustrates the optical element 105 and 106 as being disposed on the window substrate 120, in other embodiments, the window 120 may be an open space within the cavity of the housing 42. In these embodiments, the optical elements 105 and/or 106 may be affixed to a substrate extending across a length of the window 120 and/or a substrate extending from a wall of the housing 42 towards the optical paths 126 and/or 127, respectively.

FIGS. 3A-3D are exploded views of a housing of the symbology reader 100 of FIGS. 1 and 2 illustrating the optical path 126 for light produced by the diffuse illumination assembly 110 being directed toward the diffuser 128 by different types of optical elements 205. The optical element 105 of the symbology reader 100 of FIGS. 1-2 may be any of the optical elements 205.

Figure 3A:
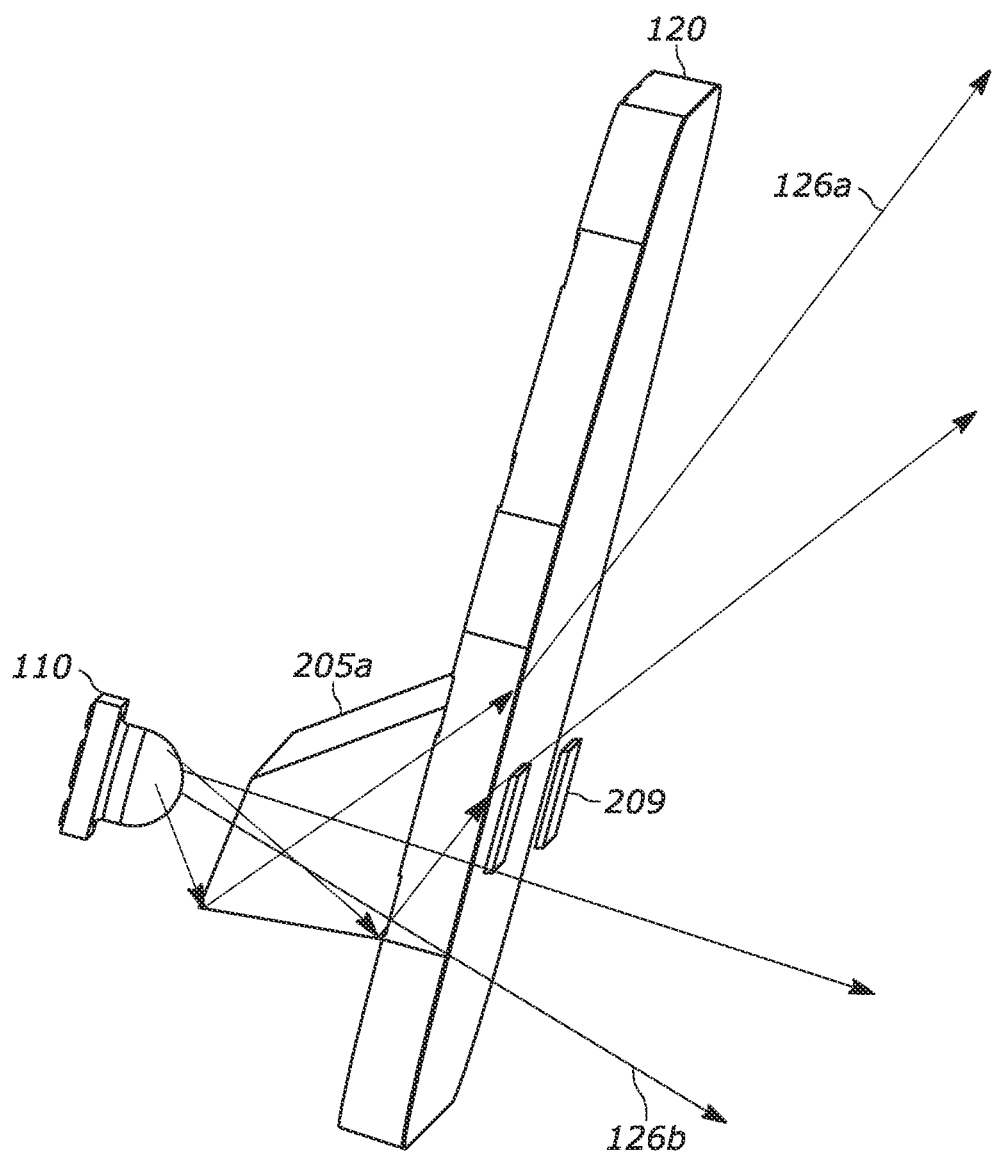
FIG. 3A is an exploded view of a housing of the symbology reader of FIGS. 1 and 2 illustrating an optical path for light produced by an illumination assembly being directed toward a diffuser by an obscurator.

Starting with FIG. 3A, illustrated is the optical path 126 for light produced by the illumination assembly 110 being directed toward the diffuser 128 by a polygon pipe 205a (such as a lens) and an obscurator 209. The obscurator 209 is configured to block the illumination light produced by the illumination assembly 110 from passing through the polygon pipe 205a and exiting the nose 130 without impinging upon the diffuser 128. The obscurator 209 may be any opaque substrate that blocks the illumination light, such as a plastic substrate, a piece of tape or a sticker, a scratch or other light blocking feature introduced onto the window 120, and so on. Accordingly, only the upper optical path 126a is directed toward the upper diffuser 128a and the lower optical path 126b is directed toward the lower diffuser 128b pass through the polygon pipe 205a and beyond the obscurator 209. It should be appreciated that in the embodiment of FIG. 3A, the optical element 105 may include both the polygon 205a and the obscurator 209.

Figure 3B:
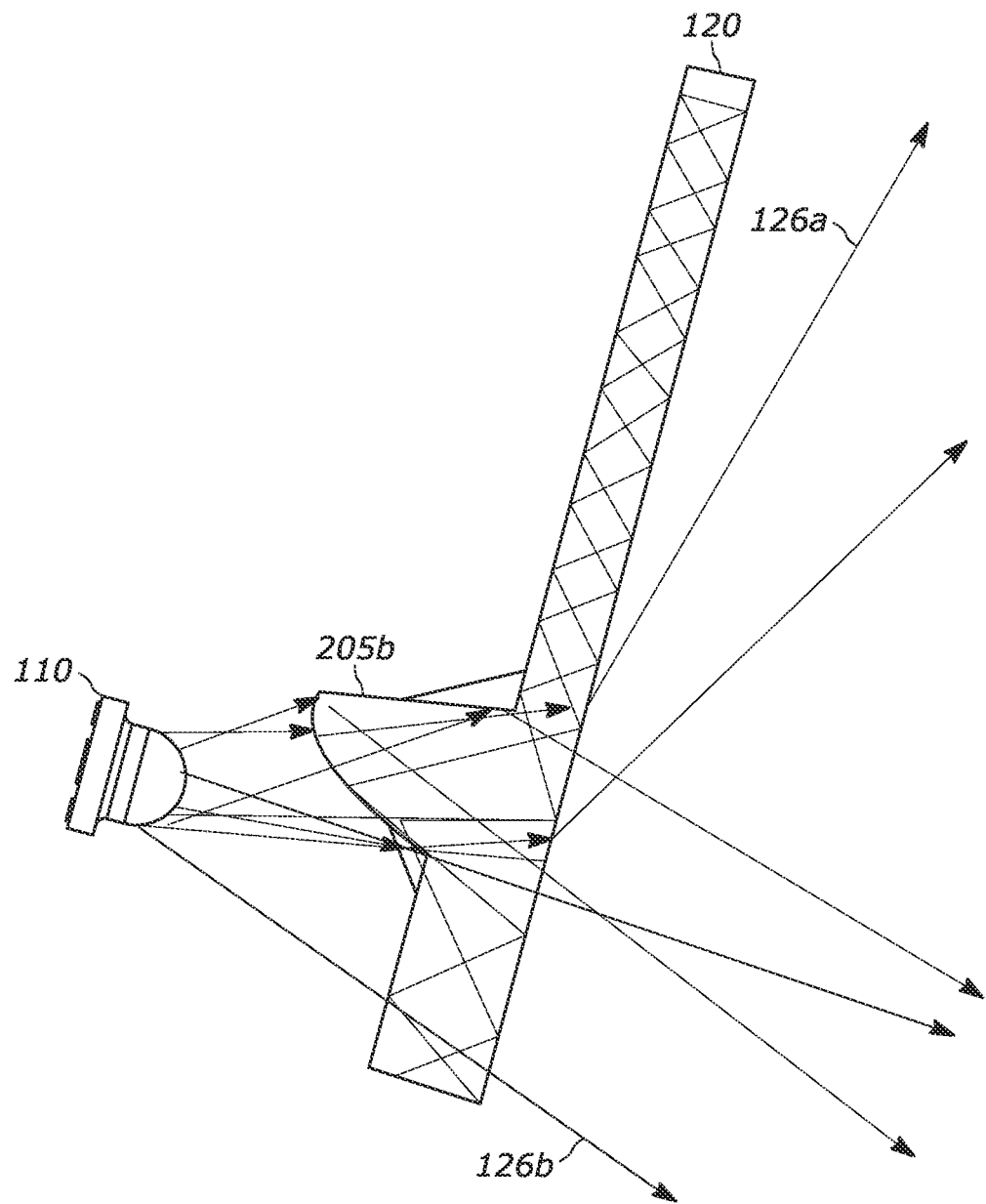
FIG. 3B is an exploded view of a housing of the symbology reader of FIGS. 1 and 2 illustrating an optical path for light produced by an illumination assembly being directed toward a diffuser by a lens.

Turning to FIG. 3B, illustrated is the optical path 126 for light produced by the illumination assembly 110 being directed toward the diffuser 128 by a lens 205b. As illustrated, the lens 205b is configured to direct light that would otherwise exit the nose 130 without impinging upon the diffuser 128 to impinge upon the diffuser 128. Accordingly, the lens 205b is configured to direct a first portion of the direct light along the optical path 126a toward the upper diffuser 128a and a second portion of the direct light along the optical path 126b toward the lower diffuser 128b.

Figure 3C:
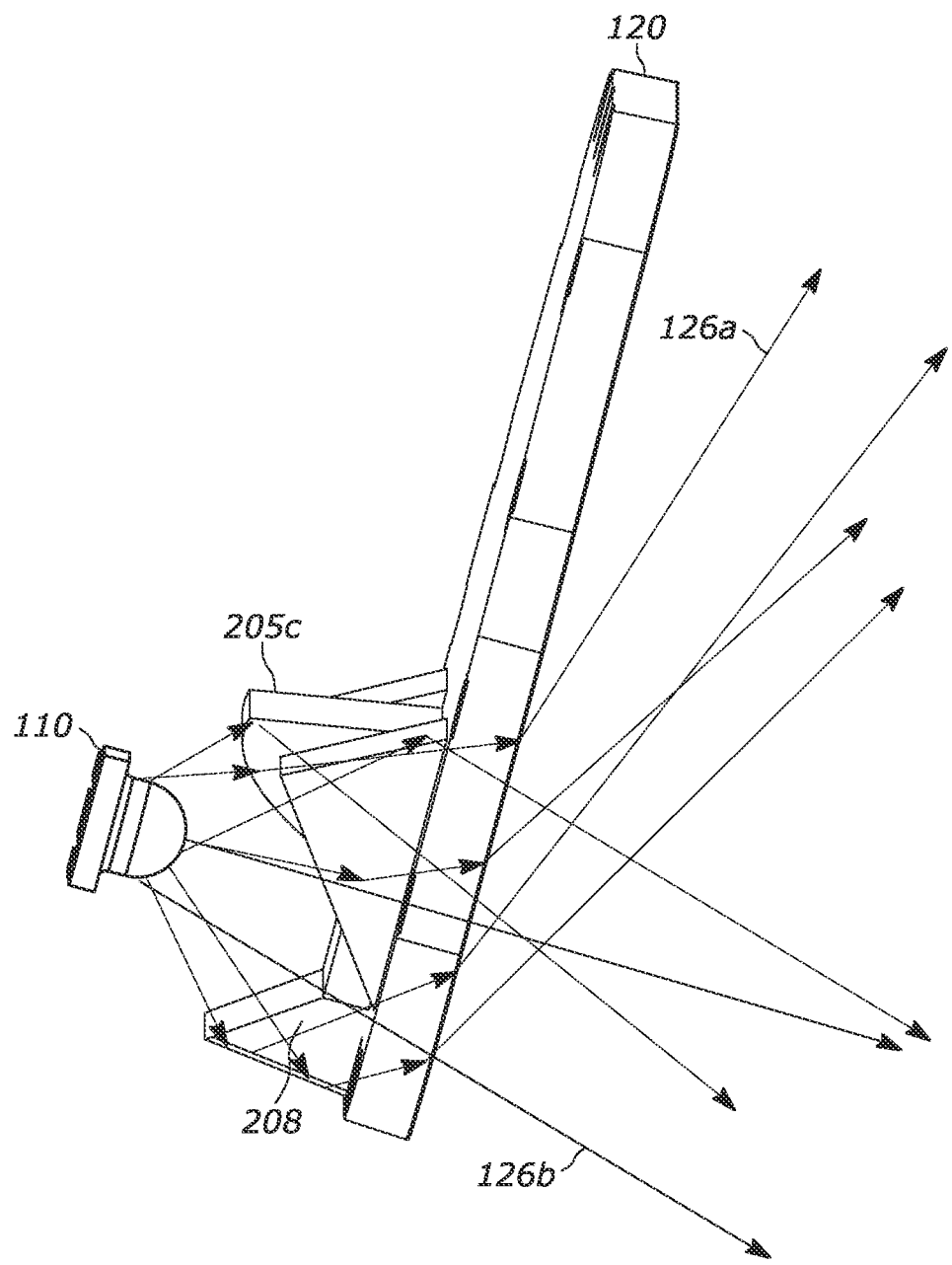
FIG. 3C is an exploded view of a housing of the symbology reader of FIGS. 1 and 2 illustrating an optical path for light produced by an illumination assembly being directed toward a diffuser by a lens having a lower reflector portion.

Referring now to FIG. 3C, illustrated is the optical path 126 for light produced by the illumination assembly 110 being directed toward the diffuser 128 by a lens 205c having a lower reflector portion 208. In some embodiments, the lens 205c has substantially the same geometry as the lens 205b. As illustrated, the lower reflector portion 208 is configured to direct an additional portion of the illumination field produced by the illumination assembly 110 toward the diffuser 128. More particularly, the lower reflector portion 208 may be configured to direct the illumination light along the upper optical path 126a toward the upper diffuser 128a. It should be appreciated that in the embodiment of FIG. 3C, the optical element 105 may include both the lens 205c and the lower reflector portion 208.

Figure 3D:
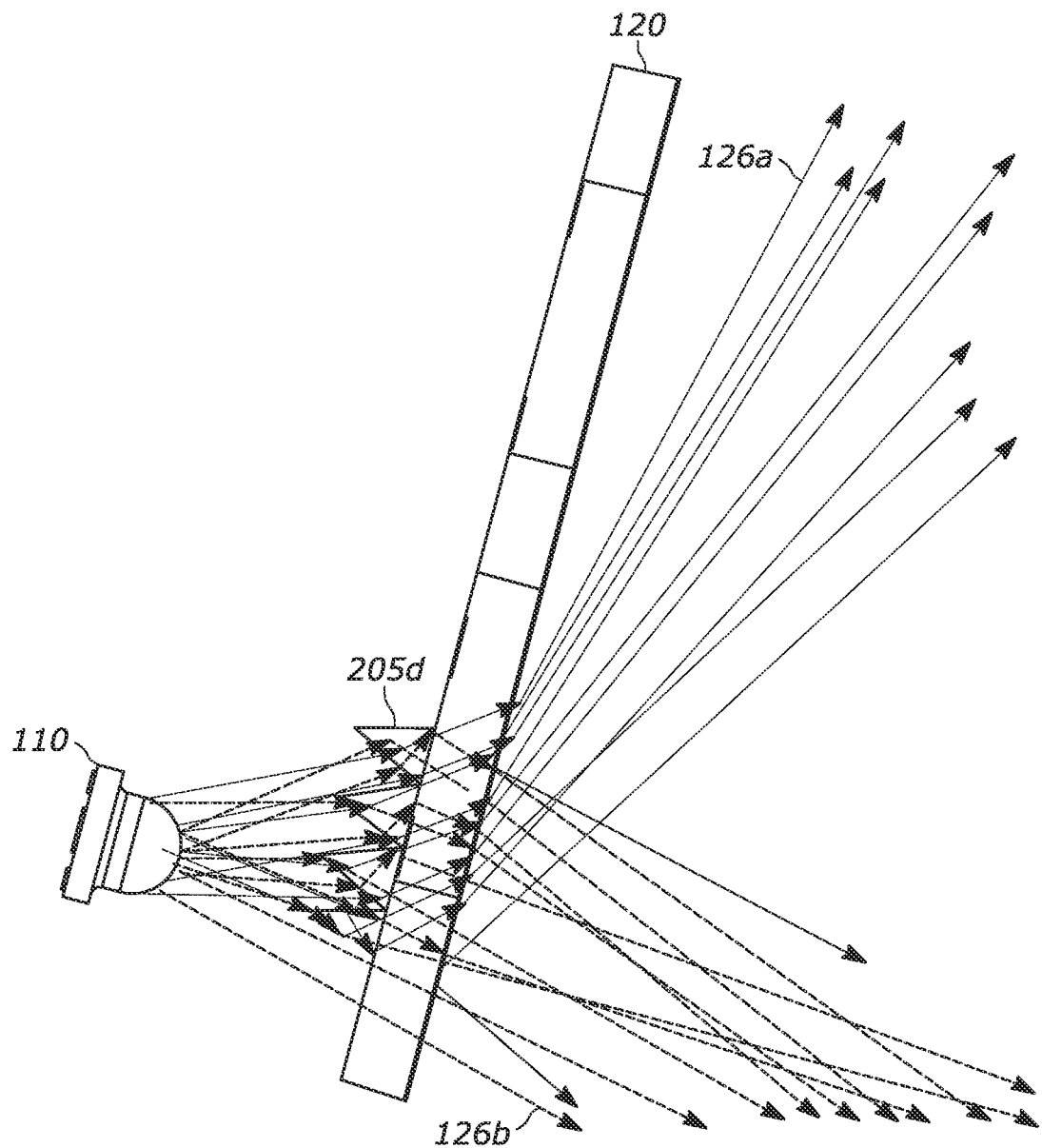
FIG. 3D is an exploded view of a housing of the symbology reader of FIGS. 1 and 2 illustrating an optical path for light produced by an illumination assembly being directed toward a diffuser by a Fresnel lens.

Referring now to FIG. 3D, illustrated is the optical path 126 for light produced by the illumination assembly 110 being directed toward the diffuser 128 by a Fresnel lens 205d. As illustrated, the Fresnel lens 205d is configured to direct light that would otherwise exit the nose 130 without impinging upon the diffuser 128 to impinge upon the diffuser 128. Accordingly, the Fresnel lens 205d is configured to direct a first portion of the direct light along the optical path 126a toward the upper diffuser 128a and a second portion of the direct light along the optical path 126b toward the lower diffuser 128b. As illustrated, while the Fresnel lens 205d is occupies less space than the lens 205b or 205c, the Fresnel lens 205d also is more difficult to mold and permits more leakage light to pass through the first portion 125 without impinging upon the diffuser 128.

It should be appreciated that the optical elements illustrated in FIGS. 3A-3D are merely exemplary types of optical elements 105. Other embodiments may include other types of optical elements. For example, the obscurator 209 may be used in combination with any of the lens 205b-d or the polygon pipe 205a may include a lower reflector portion 208. Alternatively, to reduce the amount of space occupied the optical element 105, the optical element 105 may include just the obscurator 209 without any lens 205. As another example, the optical element 105 may include one or more mirrors configured to direct the illumination light toward the diffuser 128. As yet another example, the optical element 105 may include a substrate configured such that total internal reflection directs the illumination light toward the diffuser 128.

Figure 4A:
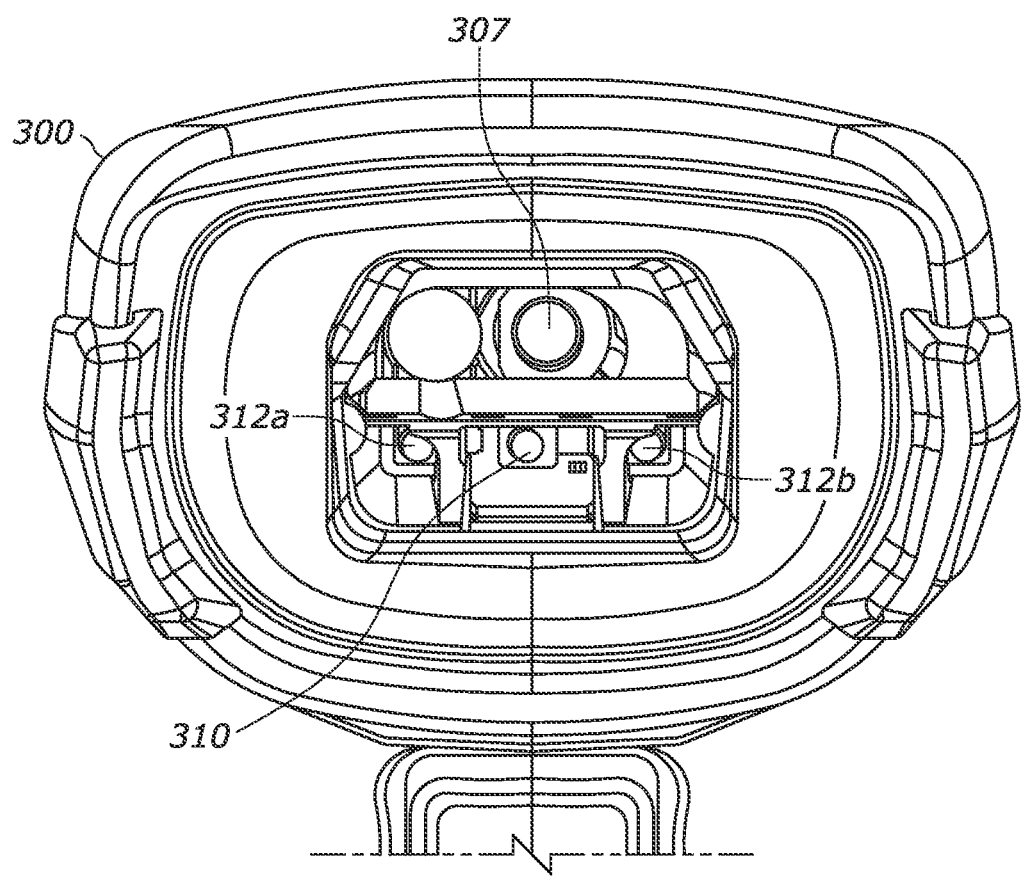
FIG. 4A is a front view of a housing of the symbology reader of FIGS. 1-3, in accordance with an example embodiment.

FIG. 4A is a front view of a housing of a symbology reader 300 (such as the symbology reader 100 of FIGS. 1-3), in accordance with an example embodiment. For ease of illustration, the window, optical elements, and diffuser are not illustrated. The symbology reader 300 includes an imaging assembly 307 (such as the imaging assembly 107 of FIG. 2) configured to capture light within an imaging FOV. Additionally, the symbology reader 300 may include multiple component direct illumination assemblies 312 (such as the direct illumination assembly 112 of FIG. 2B) to increase the intensity of light associated with direct illumination. More particularly, the symbology reader 300 may include a first component direct illumination assembly 312a and a second component direct illumination assembly 312b laterally disposed on either side of a diffuse illumination assembly 310 (such as the diffuse illumination assembly 110 of FIGS. 2A, 3). In alternate embodiments, the symbology reader 300 may include multiple component diffuse illumination assemblies 310 disposed laterally between the component direct illumination assemblies 312.

Figure 4B:
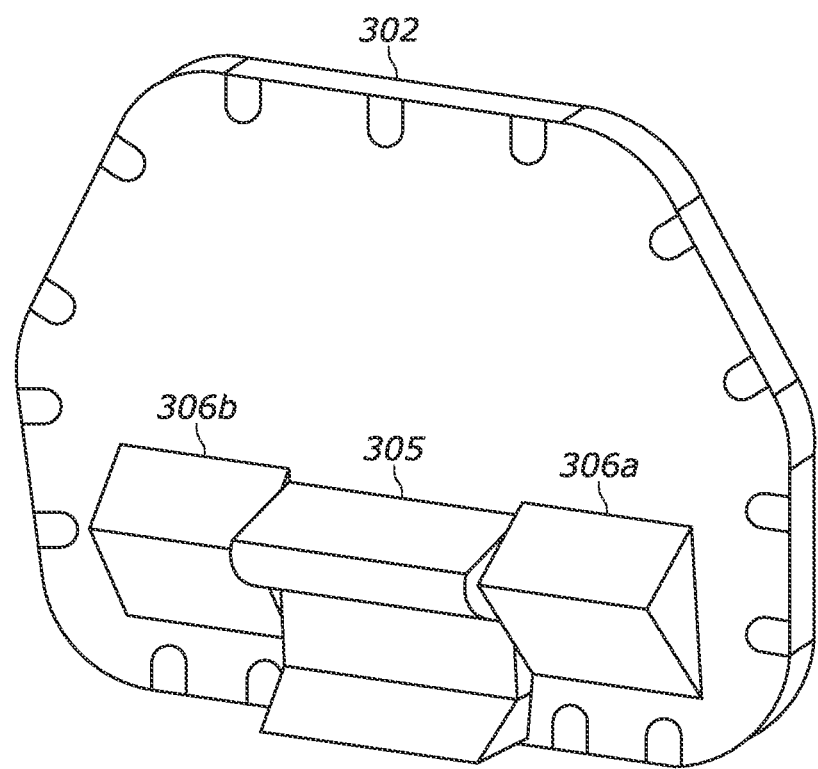
FIG. 4B is a perspective view of an example optical element of the symbology reader of FIGS. 1-3, in accordance with an example embodiment.

FIG. 4B is a perspective view of an optical element 302, in accordance with an example embodiment. More particularly, the optical element 302 is adapted for use with the example symbology reader 300 of FIG. 4A. Accordingly, the optical element 302 may include geometries 306 configured to direct the illumination light produced by the component direct illumination assemblies 312 to pass through a housing cavity of the symbology reader 300 without impinging upon a diffuser (such as the diffuser 128 of FIG. 2). More particularly, the optical element includes (i) a component geometry 306a configured to direct the illumination light produced by the component direct illumination assembly 312a to pass through the housing cavity of the symbology reader 300 without impinging upon the diffuser and (ii) a component geometry 306b configured to direct the illumination light produced by the component direct illumination assembly 312b to pass through the housing cavity of the symbology reader 300 without impinging upon the diffuser. Accordingly, the optical element 106 of FIG. 2B may be the geometries 306.

Additionally, the optical element 302 includes a geometry 305 configured to direct the illumination light produced by the diffuse illumination assembly 310 to impinge upon the diffuser 128 before exiting the housing cavity of the symbology reader 300. While the geometry 305 corresponds to the lens 205b of FIG. 3B, the geometry 305 correspond to the polygon pipe 205a of FIG. 3A, the Fresnel lens 205d of FIG. 3D, and/or include the lower reflector portion 208 of FIG. 3C. Additionally, the optical element 302 may include an obscurator (such as the obscurator 209 of FIG. 3A) disposed opposite side of the optical element 302 and aligned with the geometry 305. Accordingly, the optical element 105 of FIG. 2A may be the geometry 305 (and/or an obscurator disposed on the optical element 302). Consequently, the optical element 302 may be a substrate that integrally forms both the optical element 105 and the optical element 106.

While FIG. 4 illustrate an arrangement that includes the diffuse illumination assembly 310 disposed laterally between component direct illumination assemblies 312, in alternate embodiments, the direct illumination assembly 312 is disposed laterally between multiple component diffuse illumination assemblies 310. Accordingly, in these alternate embodiments, the optical element 302 may include the geometry 306 disposed laterally between multiple component geometries 305.

While the foregoing embodiments improve the diffusivity of light emitted by symbology readers such that symbology readers are better able to read DPM codes, additional improvements may be implemented to further improve the ability of the symbology readers to read DPM codes. To this end, while the foregoing techniques provide a diffuse illumination light when the diffuse illumination assemblies are activated, the diffuse light may not be evenly distributed. Said another way, the field of view of the imaging assembly of the symbology reader may include hotspots of diffuse illumination. If a DPM code is disposed at one of these hotspots within the FOV, the symbology reader may be less able to read the DPM code. Accordingly, the following improvements produce a more evenly distributed diffuse illumination to reduce the formation of hotspots within the FOV of the imaging assembly.

Figure 5A:
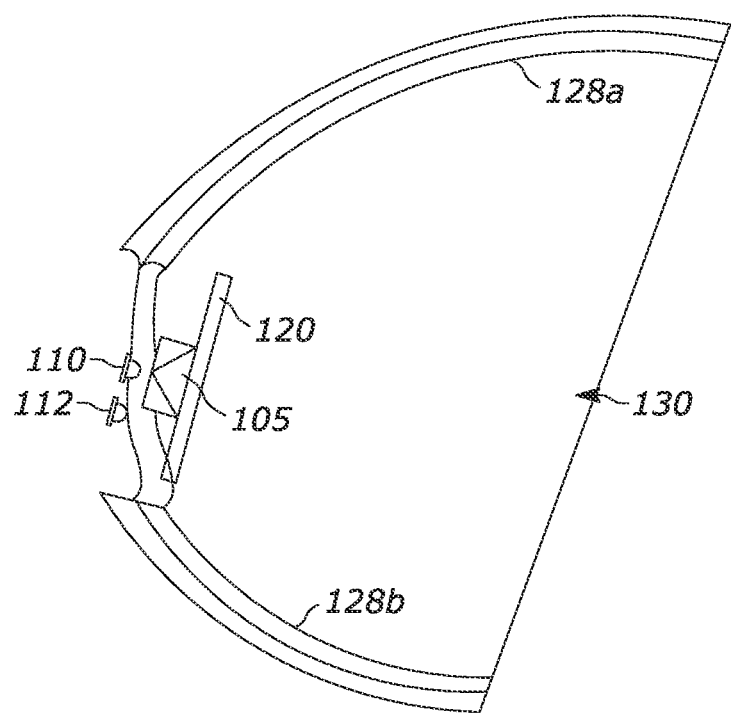
FIG. 5A is an side perspective view of a housing of the symbology reader of FIG. 1 illustrating an example diffuser shape that improves the uniformity of diffuse illumination produced by the symbology reader, in accordance with an example embodiment.
Figure 5B:
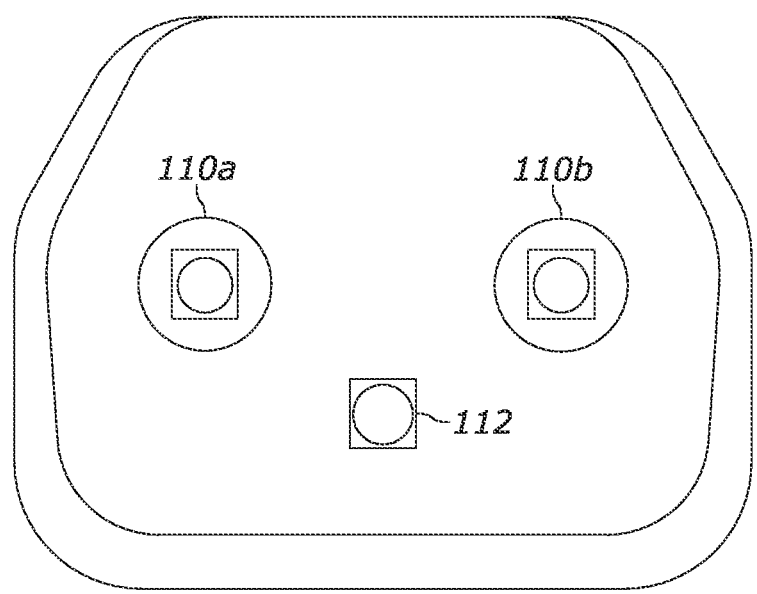
FIG. 5B is a front view of a housing of the symbology reader of FIG. 5A, in accordance with an example embodiment.

Referring now to FIGS. 5A and 5B, illustrated is example embodiment of a symbology reader 500, such as the symbology reader of FIGS. 1-4 where the housing cavity is shaped to improve the uniformity of the diffuse light emitted from the symbology reader 500. More particularly, FIG. 5A illustrates an side perspective view of a housing of the symbology reader 500 and FIG. 5B is a front view of a housing of the symbology reader 500. As illustrated, the cavity (and thus, the diffuser that lines the walls thereof) is shaped as an ellipsoid. Due to the ellipsoidal shape, the field of illumination produced by the diffuse illumination assembly 110 impinges upon the diffuser 128 at a wider variety of angles. Accordingly, the diffuser 128 diffusingly scatters the field of illumination more evenly across the FOV of the imaging assembly. It should be appreciated that in alternate embodiments, the housing cavity may be shaped as paraboloid (or any other concave spline swept 360° about an axis of rotation), a semi-ellipsoid, a semi-paraboloid, a pyramidal frustum, or a conical frustum. As shown in the embodiment illustrated in FIG. 5A, other than the shape of the housing cavity and the optical element, the symbology reader 500 may include substantially the same features as the symbology reader 100 of FIGS. 1-3.

Turning to FIG. 5B, the symbology reader 500 the includes two diffuser illumination assemblies 110 horizontally offset from one another and a single direct illumination assembly. Accordingly, a respective optical element (not depicted) may disposed in front of both diffuse illumination assembly 110a and the diffuse illumination assembly 110b. Including multiple diffuse illumination assemblies further improves the uniformity of diffuse illumination emitted by the symbology reader 500.

Figure 6B:
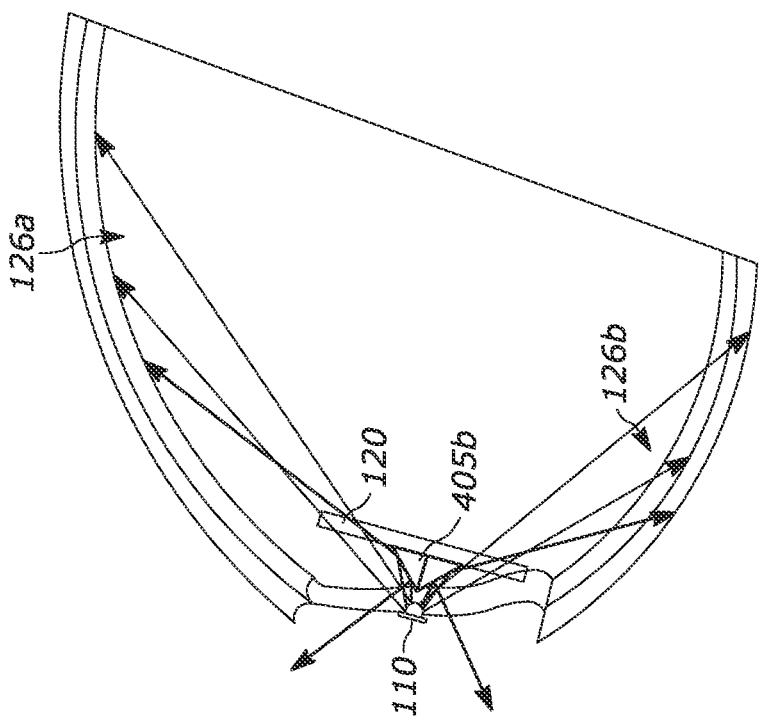
FIG. 6B is a side perspective view of a housing of the symbology reader of FIG. 5 illustrating an optical path for light produced by an illumination assembly being directed toward a diffuser by a pyramidal reflector, in accordance with an example embodiment.
Figure 6A:
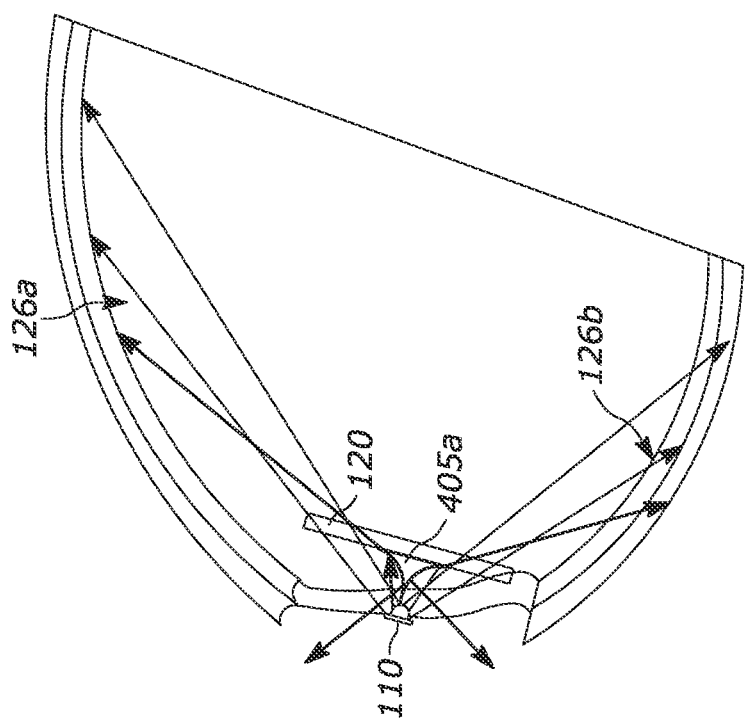
FIG. 6A is a side perspective view of a housing of the symbology reader of FIG. 5 illustrating an optical path for light produced by an illumination assembly being directed toward a diffuser by an axicon reflector, in accordance with an example embodiment.
Figure 6C:
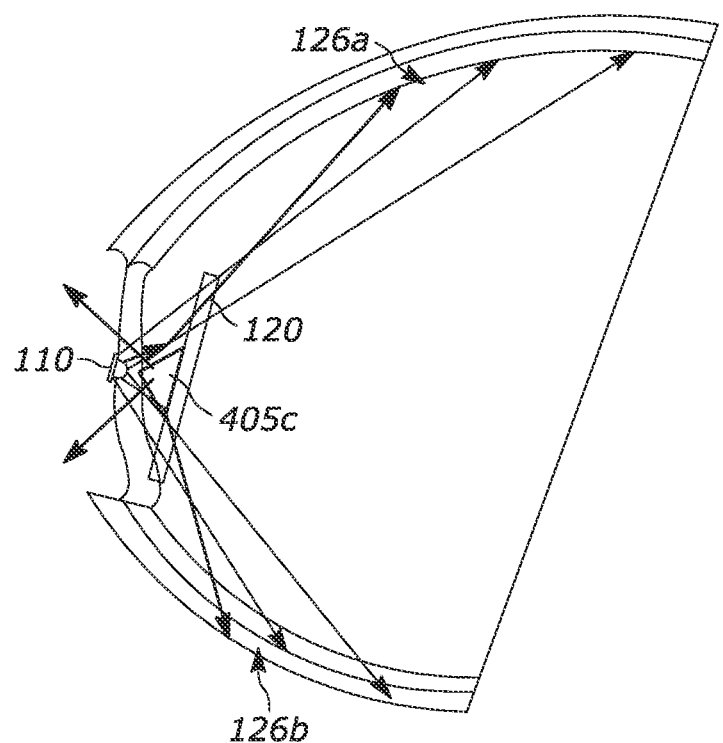
FIG. 6C is a side perspective view of a housing of the symbology reader of FIG. 5 illustrating an optical path for light produced by an illumination assembly being directed toward a diffuser by a conical reflector, in accordance with an example embodiment.

Turning to FIGS. 6A-6G, illustrated are example optical paths for light being directed to the diffuser 128 by optical elements 405. FIGS. 6A-6C illustrate the optical path for light being directed by reflector optical elements 405a-c and FIGS. 6D-6G illustrate the optical path for light being directed by refractor optical elements 405d-g.

Starting with FIG. 6A, illustrated is the optical path 126 for light produced by the diffuse illumination assembly 110 of the symbology reader 500 of FIG. 5 being directed toward the diffuser 128 by a reflective axicon 405a. In some embodiments, the surface of the reflective axicon 405a is a convex equivalent of the concave spline that defines the shape of the housing cavity. As illustrated, the pointed end of the reflective axicon 405*a* may be aligned with a central axis of the field of illumination of the diffuse illumination assembly 110 to evenly direct the light towards the diffuser 128 along the upper optical path 126*a* or the lower optical path 126*b*. It should be appreciated that not all of the light produced by the diffuse illumination assembly 110 is reflected by the reflective axicon 405*a*. To this end, the reflective axicon 405*a* may be dimensioned such that light that would pass through the housing cavity without impinging upon the diffuser 128 is reflected towards the diffuser 128 and that light that would impinge upon the diffuser 128 even without the presence of the reflective axicon 405*a* is permitted travel along its ordinary path toward the diffuser 128.

Turning to FIG. 6B, illustrated is the optical path 126 for light produced by the diffuse illumination assembly 110 of the symbology reader 500 of FIG. 5 being directed toward the diffuser 128 by a reflective pyramid 405*b*. In embodiments where the housing cavity is pyramidal, the surface of the reflective pyramid 405*b* generally matches the shape of the housing cavity. As illustrated, the pointed end of the reflective pyramid 405*b* may be aligned with a central axis of the field of illumination of the diffuse illumination assembly 110 to evenly direct the light towards the diffuser 128 along the upper optical path 126*a* or the lower optical path 126*b*. It should be appreciated that not all of the light produced by the diffuse illumination assembly 110 is reflected by the reflective pyramid 405*b*. To this end, the reflective pyramid 405*b* may be dimensioned such that light that would pass through the housing cavity without impinging upon the diffuser 128 is reflected towards the diffuser 128 and that light that would impinge upon the diffuser 128 even without the presence of the reflective pyramid 405*b* is permitted travel along its ordinary path toward the diffuser 128.

Turning to FIG. 6C, illustrated is the optical path 126 for light produced by the diffuse illumination assembly 110 of the symbology reader 500 of FIG. 5 being directed toward the diffuser 128 by a reflective cone 405*c*. In embodiments where the housing cavity is conical, the surface of the reflective cone 405*c* generally matches the shape of the housing cavity. As illustrated, the pointed end of the reflective cone 405*c* may be aligned with a central axis of the field of illumination of the diffuse illumination assembly 110 to evenly direct the light towards the diffuser 128 along the upper optical path 126*a* or the lower optical path 126*b*. It should be appreciated that not all of the light produced by the diffuse illumination assembly 110 is reflected by the reflective pyramid 405*b*. To this end, the reflective cone 405*c* may be dimensioned such that light that would pass through the housing cavity without impinging upon the diffuser 128 is reflected towards the diffuser 128 and that light that would impinge upon the diffuser 128 even without the presence of the reflective cone 405*c* is permitted travel along its ordinary path toward the diffuser 128.

Figure 6D:
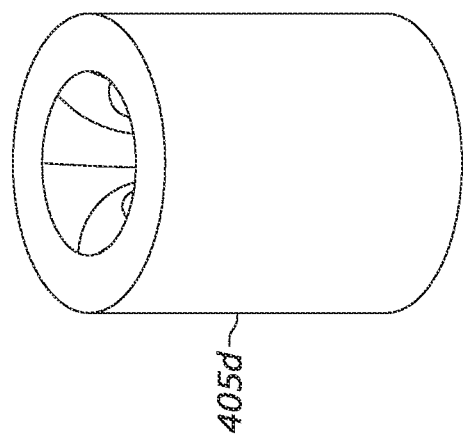
FIG. 6D is a side perspective view of a housing of the symbology reader of FIG. 5 illustrating an optical path for light produced by an illumination assembly being directed toward a diffuser by a revolved prism refractor, in accordance with an example embodiment.
Figure 6D:
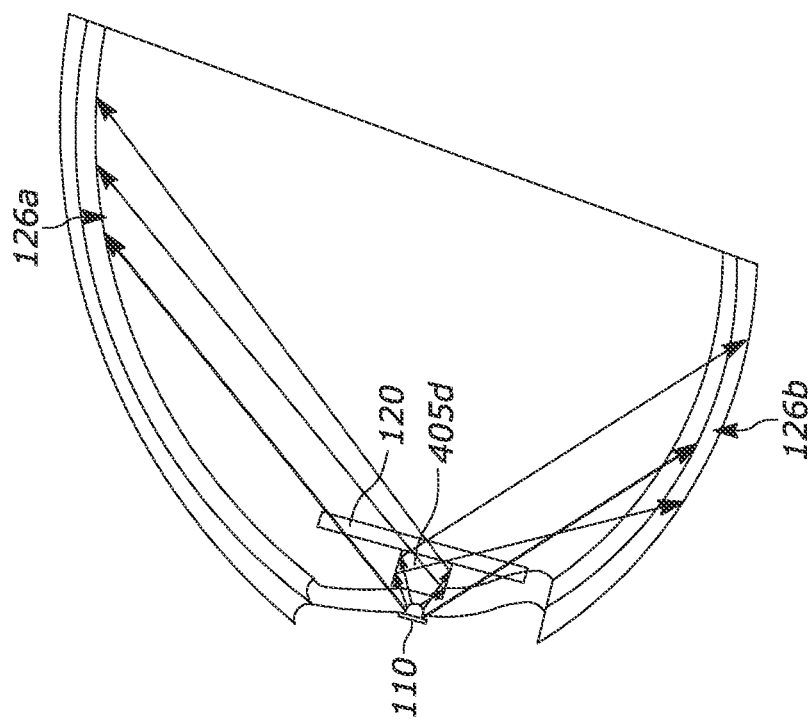

Turning now to FIG. 6D, illustrated is the optical path 126 for light produced by the diffuse illumination assembly 110 of the symbology reader 500 of FIG. 5 being directed toward the diffuser 128 by a refractive revolved prism 405*d*. As illustrated by the perspective view of the revolved prism 405*d*, the revolved prism 405*d* may have a cylindrical exterior surface, but an interior surface shaped as an axicon. In some embodiments, the surface of the internal axicon 405*a* is a convex equivalent of the concave spline that defines the shape of the housing cavity. As illustrated, the center of the revolved prism 405*d* may be aligned with a central axis of the field of illumination of the diffuse illumination assembly 110 to evenly direct the light towards the diffuser 128 along the upper optical path 126*a* or the lower optical path 126*b*. It should be appreciated that not all of the light produced by the diffuse illumination assembly 110 is refracted by the revolved prism 405*d*. To this end, the revolved prism 405*d* may be dimensioned such that light that would pass through the housing cavity without impinging upon the diffuser 128 is refracted towards the diffuser 128 and that light that would impinge upon the diffuser 128 even without the presence of the revolved prism 405*d* is permitted travel along its ordinary path toward the diffuser 128.

Figure 6F:
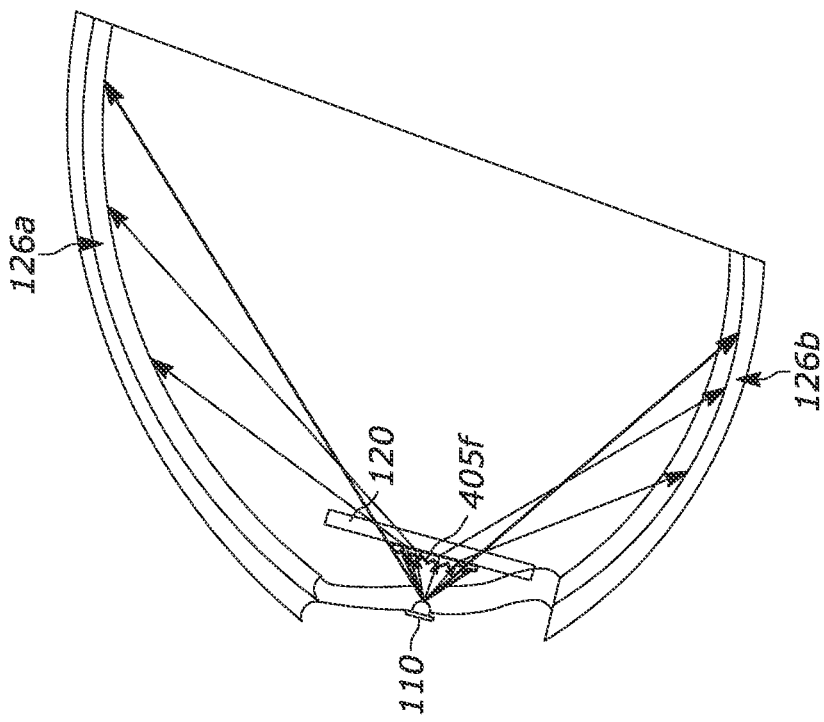
FIG. 6F is a side perspective view of a housing of the symbology reader of FIG. 5 illustrating an optical path for light produced by an illumination assembly being directed toward a diffuser by a Fresnel refractor, in accordance with an example embodiment.
Figure 6E:
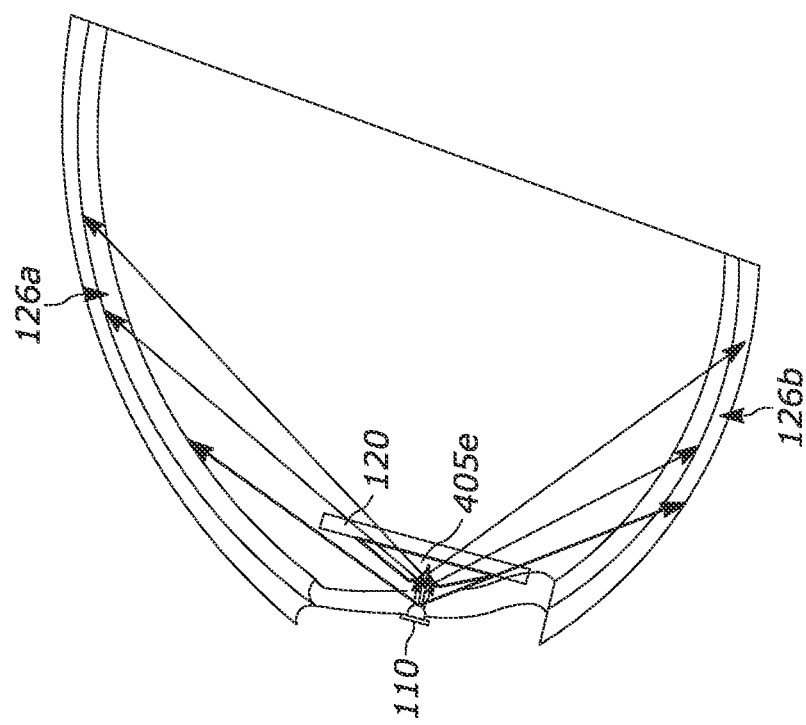
FIG. 6E is a side perspective view of a housing of the symbology reader of FIG. 5 illustrating an optical path for light produced by an illumination assembly being directed toward a diffuser by an axicon refractor, in accordance with an example embodiment.

Turning now to FIG. 6E, illustrated is the optical path 126 for light produced by the diffuse illumination assembly 110 of the symbology reader 500 of FIG. 5 being directed toward the diffuser 128 by a refractive axicon 405*e*. As illustrated, the pointed end of the refractive axicon 405*e* may be aligned with a central axis of the field of illumination of the diffuse illumination assembly 110 to evenly direct the light towards the diffuser 128 along the upper optical path 126*a* or the lower optical path 126*b*. It should be appreciated that not all of the light produced by the diffuse illumination assembly 110 is refracted by the refractive axicon 405*e*. To this end, the refractive axicon 405*e* may be dimensioned such that light that would pass through the housing cavity without impinging upon the diffuser 128 is refracted towards the diffuser 128 and that light that would impinge upon the diffuser 128 even without the presence of the refractive axicon 405*e* is permitted travel along its ordinary path toward the diffuser 128.

Turning now to FIG. 6F, illustrated is the optical path 126 for light produced by the diffuse illumination assembly 110 of the symbology reader 500 of FIG. 5 being directed toward the diffuser 128 by a refractive Fresnel lens 405*f*. The Fresnel lens may be substantially similar to the Fresnel lens 205*d* of FIG. 3D. It should be appreciated that not all of the light produced by the diffuse illumination assembly 110 is refracted by the Fresnel lens 405*f*. To this end, the Fresnel lens 405*f* may be dimensioned such that light that would pass through the housing cavity without impinging upon the diffuser 128 is refracted towards the diffuser 128 and that light that would impinge upon the diffuser 128 even without the presence of the Fresnel lens 405*f* is permitted travel along its ordinary path toward the diffuser 128.

Figure 6G:
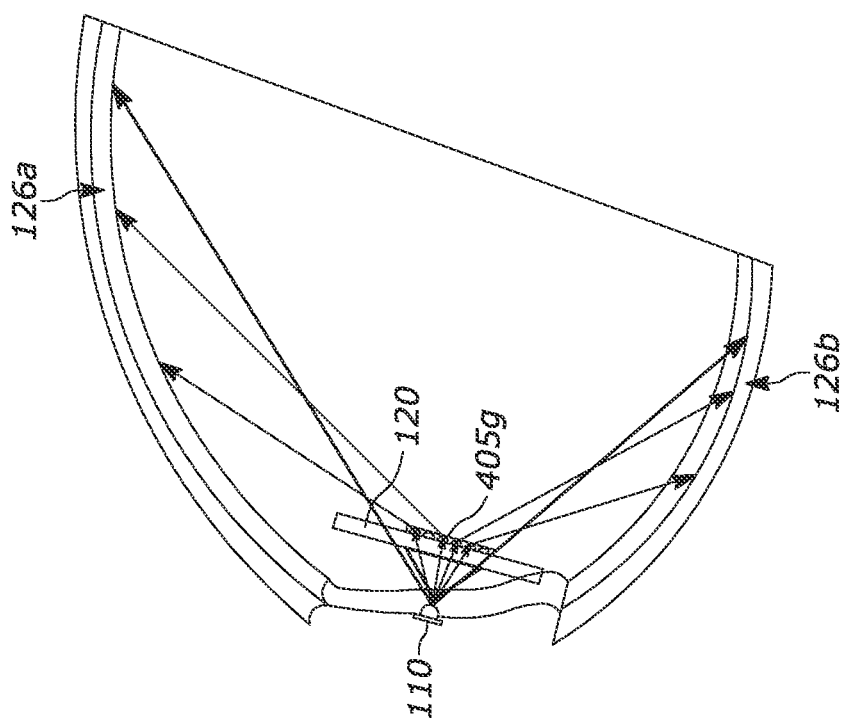
FIG. 6G is a side perspective view of a housing of the symbology reader of FIG. 5 illustrating an optical path for light produced by an illumination assembly being directed toward a diffuser by a microlens array refractor, in accordance with an example embodiment.

Turning now to FIG. 6G, illustrated is the optical path 126 for light produced by the diffuse illumination assembly 110 of the symbology reader 500 of FIG. 5 being directed toward the diffuser 128 by a refractive microlens array 405*g*. Lenses of the microlens array may have slightly different indices of refraction causing the light emitted by the diffuse illumination assembly 110 to be refracted at a plurality of different angles. As illustrated the microlens array 405*g* is configured to have a gradient of indices of refractions centered about the central illumination axis of the diffuse illumination assembly 110 to evenly direct the light towards the diffuser 128 along the upper optical path 126*a* or the lower optical path 126*b*. It should be appreciated that not all of the light produced by the diffuse illumination assembly 110 is refracted by the microlens array 405*g*. To this end, the microlens array 405*g* may be dimensioned such that light that would pass through the housing cavity without impinging upon the diffuser 128 is refracted towards the diffuser 128 and that light that would impinge upon the diffuser 128 even without the presence of the microlens array 405*g* is permitted travel along its ordinary path toward the diffuser 128.

It should be appreciated that the optical elements illustrated in FIGS. 6A-6G are merely exemplary types of optical elements 105. Other embodiments may include other types of optical elements configured to direct the light produced by the diffuse illumination assembly 110 toward the diffuser 128.

Figure 7:
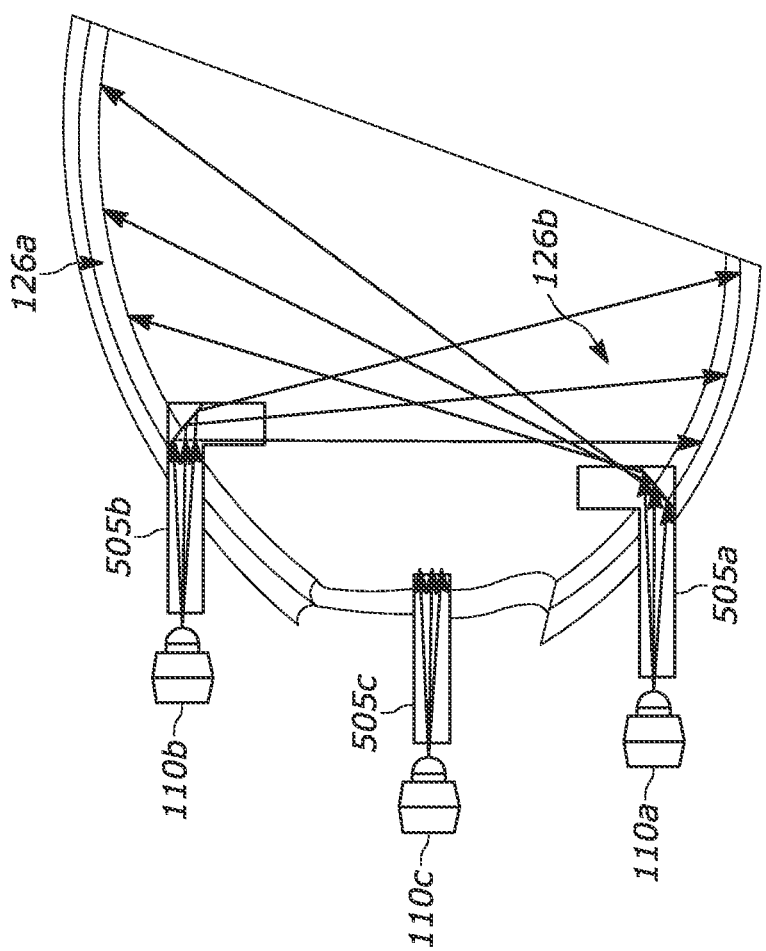
FIG. 7 is a side perspective view of a housing of the symbology reader of FIG. 5 illustrating an optical path for light produced by an illumination assembly being directed toward a diffuser via light pipes, in accordance with an example embodiment.

For example, FIG. 7 illustrates the optical path 126 for light produced by the diffuse illumination assembly 110 of the symbology reader 500 of FIG. 5 being directed toward the diffuser 128 via light pipes 505. The light pipes 505 may be optic cabling that guides the light along a path using total internal reflection. While the example embodiment illustrated in FIG. 7 depicts the symbology reader 500 including three light pipes 505, alternate embodiments may include any number of light pipes.

As illustrated, the symbology reader 500 includes a diffuse illumination assembly 110 for each light pipe 505. Accordingly, a proximal end of the each light pipe 505 may by positioned to receive most of the light produced by the respective diffuse illumination assembly 110 and the distal end of each light pipe 505 is disposed within the housing cavity. It should be appreciated that the distal ends of the light pipes 505 may be evenly distributed along a plane of the housing cavity. As a result, the composite of the light passing through the light pipes 505 is more evenly distributed about the FOV for the imaging assembly of the symbology reader 500.

In some embodiments, a lens is positioned over the distal end of each light pipe 505. The lens may be configured to spread the light exiting the light pipe 505 over a broader range of angles. Consequently, including a lens over the distal end of each light pipe 505 further improves the uniformity of light across the FOV for the imaging assembly. Accordingly, in some embodiments, the optical element 105 is just the light pipe 505, and in other embodiments, the optical element 105 is the light pipe 505 and its corresponding lens.

Figure 8:
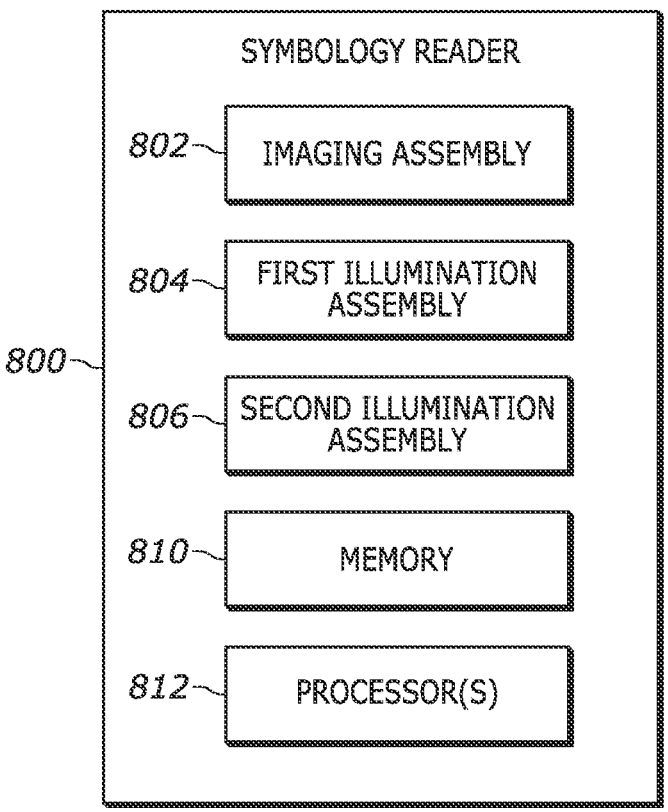
FIG. 8 is a block diagram representative of an embodiment of the symbology reader of FIGS. 1-7.

Turning now to FIG. 8, illustrated is a block diagram representative of a symbology reader 800, such as the symbology reader 100 of FIGS. 1-7. In the illustrated example, the symbology reader 800 includes an imaging assembly 802 generally configured to sense barcodes and/or DPM codes disposed on objects of interest. The imaging assembly 802 may be a camera and include any known imaging components for capturing image data. For example, the imaging assembly 802 may include an array of image sensors configured to detect reflections of light that pass through a lens system, such as a lens system that includes the optical elements 105 and/or 106 of FIG. 2. Additionally or alternatively, the first imaging assembly 802 may include one or more filters configured to filter the reflected light before and/or after it is sensed by the image sensor array.

In some embodiments, the imaging assembly 802 includes different imaging components that are separately configured to sense barcodes and DPM codes. For example, to read relatively small DPM codes, the imaging components configured to sense DPM codes may have a higher pixel density than the imaging components configured to sense barcodes. In some embodiments, to achieve this higher pixel density, the imaging components configured to sense DPM codes are configured to have a narrower field of view than the imaging components configured to sense barcodes.

As illustrated, the symbology reader 800 also includes a first illumination assembly 804 and a second illumination assembly 806. The illumination assemblies 804 and 806 may be configured to emit light at a particular wavelength or range of wavelengths. For example, the illumination assemblies 804 and 806 may include one or more light emitting diodes (LEDs) or other types of light sources. As illustrated in FIGS. 2A and 2B respectively, the first illumination assembly 804 may be positioned such that the light emitted by the first illumination assembly 804 passes through the optical element 105 and impinges upon a diffuser (such as the diffuser 128 of FIG. 2A) to provide diffuse illumination and the second illumination assembly 806 may be positioned such that the light emitted by the second illumination assembly 806 passes through the optical element 106 to provide direct illumination. In some embodiments, the first illumination assembly 804 is configured to emit light at a different wavelength than the second illumination assembly 806. Accordingly, the imaging assembly 802 may be configured to filter light at the wavelength associated with the second illumination assembly 806 when sensing DPM codes and to filter light at the wavelength associated with the first illumination assembly 804 when sensing barcodes.

In some embodiments, the LED(s) of the first illumination assembly 804 are configurable to produce light at different intensities across a field of illumination. In embodiments where the housing cavity of the symbology reader 800 is shaped to produce more uniform diffuse illumination (such as the symbology readers of FIGS. 5-7), the rays that comprise the illumination field travel paths of varying lengths to reach the DPM code and scatter back towards the imaging assembly 402. Accordingly, the reflected light sensed at the imaging assembly 402 may include hotspots where the diffuse illumination light traveled shorter distances if the LED(s) of the first illumination assembly 804 are configured to produce an uniform field of illumination. Instead, in some embodiments, the first illumination assembly 804 is configured to cause the LED(s) to produce a field of illumination that accounts for the varying distances the rays must travel to reach a DPM code. More particularly, the first illumination assembly 804 may configure LED(s) such that the rays that have shorter distances to reach the DPM code have a lower intensity than the rays that have longer distances to reach the DPM code.

It should be appreciated that generally only one of the first illumination assembly 804 and the second illumination assembly 806 is active at any time. To control which illumination assembly is active, the example symbology reader 800 includes one or more processors 812 configured to execute one or more processor-executable instructions stored in a memory 810 associated with the systems and methods as described herein, for example, implement the example operations represented by the block diagrams or flowcharts of the drawings accompanying this description. Additionally, some of the processor-executable instructions form an image analysis routine configured to cause the one or more processors 812 to analyze sets of image data sensed by the imaging assembly 802 to detect the presence of a DPM code or a barcode. Upon detecting the presence of the DPM code or the barcode, the image analysis routine may decode the DPM code or the barcode to determine the encoded information.

As another example, some the processor-executable instructions may form an illumination control routine configured to control when the first illumination assembly 804 and the second illumination assembly 806 are active. In some embodiments, the illumination control routine is configured to automatically alternate between selectively activating the first illumination assembly 804 and the second illumination assembly 806. For example, the illumination control routine may be configured to automatically alternate between selectively activating the illumination assemblies

804 and 806 every 20 ms, every 40 ms, every 100 ms, every 500 ms, every second, and so on. As another example, the illumination control routine may be configured to automatically alternate between selectively activating the illumination assemblies 804 and 806 based upon the image analysis routine detecting an image object that likely corresponds to a DPM code or a barcode. That is, if the first illumination assembly 804 is active and the image analysis routine detects an image object that likely corresponds to a barcode, the illumination control routine may deactivate the first illumination assembly 804 and activate the second illumination assembly 806. Conversely, if the second illumination assembly 806 is active and the image analysis routine detects an image object that likely corresponds to a DPM code, the illumination control routine may deactivate the second illumination assembly 806 and activate the first illumination assembly 804.

In some embodiments, the example symbology reader 800 also includes one more user input mechanisms (not depicted) to indicate whether the symbology reader 800 is being used to read DPM codes or barcodes. In one example, the symbology reader 800 includes a touch screen that provides a graphical user interface via which a user may select a desired mode of operation. Accordingly, if the user indicates that the symbology reader 800 should operate in a DPM code reading mode, the illumination control routine may be configured to activate the first illumination assembly 804 and deactivate the second illumination assembly 806. Similarly, if the user indicates that the symbology reader 800 should operate in a barcode reading mode, the illumination control routine may be configured to deactivate the first illumination assembly 804 and activate the second illumination assembly 806. In another example, the symbology reader 800 includes physical inputs, such as switches, buttons, toggles, etc., that enable the user to indicate the desired mode of operation.

Figure 9:
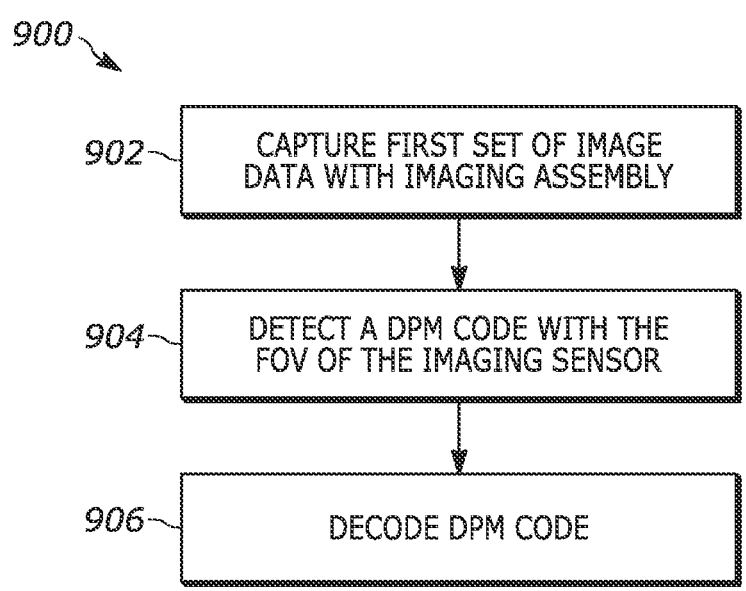
FIG. 9 is a flow chart of a method for reading DPM codes using the symbology reader of FIGS. 1-8, in accordance with an example embodiment.

FIG. 9 is a flow chart of a method 900 for reading DPM codes (such as a DPM code 25 of FIG. 1B) using a symbology reader (such as the example symbology readers of FIGS. 1-8), in accordance with an example embodiment. The method 900 may be performed by the processors 812 of the symbology reader 800 executing a set of processor-executable instructions stored at the memory 810.

The method 900 begins at block 902 when the symbology reader captures a first set of image data using an imaging assembly (such as the imaging assembly 107 of FIG. 2, the imaging assembly 307 of FIG. 4A, or the imaging assembly 802 of FIG. 8). The processors 812 of the symbology reader 800 may be configured to periodically (e.g., twenty four times a second, ten times a second, five times a second, every second) trigger the imaging assembly to capture a set of image data. As described herein, the imaging assembly may be generally configured to read DPM codes and/or barcodes.

In some embodiments, prior to capturing the first set of image data, a first illumination assembly (such as the illumination assembly 110 of FIGS. 2A and 3, the illumination assembly 310 of FIG. 4A, or the first illumination assembly 804 of FIG. 8) that emits light along an optical path towards an optical element (such as the optical element 105 of FIG. 2A or the geometry 305 of FIG. 4B) configured to direct the emitted light toward a diffuser (such as the diffuser 128 of FIG. 2). Thus, the illumination light emitted by the symbology reader when the first illumination assembly is activated is diffuse (e.g., exits a nose of the symbology reader at a plurality of different angles) such that higher contrast image data is sensed by the imaging assembly. As a result, the symbology reader is better able to detect and decode DPM codes.

In some embodiments, the symbology reader also includes a second illumination assembly (such as the illumination assembly 112 of FIG. 2B, the illumination assemblies 312 of FIG. 4A, or the second illumination assembly 806 of FIG. 8) that emits light along an optical path configured to pass through the first portion of the cavity without impinging on the one or more walls (and/or a diffuser thereon). Thus, the illumination light emitted by the symbology reader when the second illumination assembly is activated directly illuminates a FOV of the imaging assembly. As described above, when direct illumination is used to scan DPM codes, the resulting image data is distorted due to specular reflections. Accordingly, when the second illumination assembly is activated, the symbology reader may be configured to activate the first illumination assembly and contemporaneously deactivate the second illumination assembly to capture the first set of image data associated with the DPM code. In one example, the symbology reader executes a illumination control routine to activate the first illumination assembly and to deactivate the second illumination assembly.

At block 904, the symbology reader analyzes the first set of image data to detect a DPM code within a field of view (FOV) of the imaging assembly. It should be appreciated that symbology reader generally cannot know for certain that a DPM code is represented by the first set of image data without successfully decoding the DPM code. Thus, the symbology reader may be configured to identify particular features of the DPM code that are indicative of the presence of the DPM code. For example, the feature may be a particular shape or pattern of shapes detected on the object. In some embodiments, the symbology reader executes an image analysis routine to analyze the first set of image data.

At block 906, the symbology reader analyzes the first set of image data to decode the detected DPM code. The symbology reader may be utilized in a manufacturing environment in which the object is a component of a larger product being assembled at a plant. In these embodiments, the method 900 may include an additional block where the symbology reader determines an identifier of the object encoded by the DPM code and transmits the identifier to a remote server to update a database of parts associated with the object. Accordingly, as the user uses the symbology reader to read DPM codes on a plurality of objects that form the product, the database of parts is updated to include an indication of each object that forms the product.

In some scenarios, the symbology reader may also be configured to read barcodes using illumination provided by the second illumination assembly. In one example, the symbology reader executes the illumination control routine to activate the second illumination assembly and to deactivate the first illumination assembly. Accordingly, the symbology reader may be configured to activate the second illumination assembly and contemporaneously deactivate the first illumination unit. After the second illumination unit is activated, the symbology reader may be configured to capture a second set of image data by the imaging assembly. The symbology reader may then analyze the second set of image data to detect a presence of a feature of a printed barcode within the FOV of the imaging sensor. Accordingly, the symbology reader may then decode the printed barcode by analyzing the second set of image data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A symbology reader comprising:
a housing that defines a cavity having a first portion and a second portion, the first portion of the cavity being further defined by one or more walls;
a window positioned within the cavity, wherein the window separates the first portion of the cavity and the second portion of the cavity;
a diffuser positioned within the first portion of the cavity, the diffuser configured to diffusingly reflect light that impinges thereon;
an imaging assembly positioned within the second portion of the cavity and configured to capture light from an imaging field of view (FOV) extending through the window and the first portion of the cavity;
a first illumination assembly positioned within the second portion of the cavity and configured to emit a first illumination light towards the window; and
a first optical element configured to direct a first amount of a total amount of the first illumination light to exit the window and thereafter impinge on the diffuser.

2. The symbology reader of claim 1, wherein the first optical element includes a lens.

3. The symbology reader of claim 2, wherein the lens is a Fresnel lens.

4. The symbology reader of claim 2, wherein the lens includes a lower reflector portion configured to redirect the first illumination light towards a portion of the diffuser located on an upper surface of the first portion of the cavity.

5. The symbology reader of claim 1, wherein the first optical element includes an obscurator that prevents most of the first illumination light from passing through the first portion of the cavity without impinging on the one or more walls.

6. The symbology reader of claim 1, wherein the diffuser lines the one or more walls of the first portion of the cavity.

7. The symbology reader of claim 6, wherein the diffuser is at least a section of the one or more walls that is substantially white.

8. The symbology reader of claim 1, wherein the ratio of the first amount of the total amount of the first illumination light to a second amount of the total amount of the first illumination light that exits the window and passes through the first portion of the cavity without impinging on the one or more walls is 1:1 or greater.

9. The symbology reader of claim 1, wherein the apparatus further comprises:
a second illumination assembly positioned within the second portion of the cavity and configured to emit a second illumination light towards the window; and
a second optical element configured to direct at least some of the second illumination light to pass through the first portion of the cavity without impinging on the one or more walls, wherein the directed at least some of the second illumination light includes an amount of the total amount of the second illumination light that exits the window and passes through the first portion of the cavity without impinging on the one or more walls.

10. The symbology reader of claim 9, wherein the first optical element and the second optical element are integrally formed on a substrate.

11. The symbology reader of claim 10, wherein the controller is configured to automatically alternate between selectively activating the first illumination assembly and the second illumination assembly.

12. The symbology reader of claim 10, wherein the controller is configured to detect a user input to selectively activate the first illumination assembly or the second illumination assembly.

13. The symbology reader of claim 10, wherein the controller is configured to:
while the first illumination assembly is activated and the second illumination assembly is deactivated, detect a direct part marking (DPM) code within the FOV of the imaging assembly; and
in response to detecting the DPM code, analyze a set of image data captured by the imaging assembly to decode the DPM code.

14. The symbology reader of claim 9, further comprising:
a controller configured to selectively activate one of the first illumination assembly and the second illumination assembly.

15. The symbology reader of claim 14, wherein the optical element includes at least one optical pipe.

16. The symbology reader of claim 9, wherein the ratio of the first amount of the total amount of the second illumination light to a second amount of the total amount of second illumination light that exits the window and passes through the first portion of the cavity without impinging on the one or more walls is less than or equal to 1:1.

17. The symbology reader of claim 1, wherein the optical element is a reflector.

18. The symbology reader of claim 17, wherein the reflector forms the shape of one of an axicon, a pyramid, or a cone.

19. The symbology reader of claim 1, wherein the optical element is a refractor.

20. The symbology reader of claim 19, wherein the refractor is one of a revolved prism, a Fresnel lens, or a microlens array, or forms the shape of an axicon.

21. A symbology reader comprising:
a housing that defines a cavity having a first portion and a second portion, the first portion of the cavity being further defined by one or more walls;
a diffuser positioned within the first portion of the cavity, the diffuser configured to diffusingly reflect light that impinges thereon;
an imaging assembly positioned within the second portion of the cavity and configured to capture light from an imaging field of view (FOV) extending through the cavity of the housing;
a first illumination assembly positioned within the first portion of the cavity, the first illumination assembly configured to indirectly illuminate a DPM code, wherein the first illumination assembly emits light towards an optical element configured to redirect at least some of the light emitted by an illumination source of the first illumination assembly toward the diffuser, wherein the diffuser further scatters the at least some light towards the DPM code thereby indirectly illuminating the DPM code; and
a second illumination assembly configured to directly illuminate a barcode.

22. The symbology reader of claim 21, further comprising:
a window positioned within the cavity, wherein the window separates the first portion the cavity and the second portion of the cavity.

23. The symbology reader of claim 21, wherein:
the second illumination assembly is configured to emit light towards an optical element configured to redirect at least some of the light emitted by an illumination source of the second illumination assembly to pass through the housing such that at least 70% of the light emitted by the illumination source of the second illumination assembly passes through the cavity of the housing without impinging upon the diffuser.

24. The symbology reader of claim 21, wherein:
the second illumination assembly is configured to emit light such that at least 70% of the light emitted by the illumination source of the second illumination assembly passes through the cavity of the housing without impinging upon the diffuser.

25. The symbology reader of claim 21, further comprising:
a controller configured to selectively activate one of the first illumination assembly and the second illumination assembly.

26. A method of reading direct part marking (DPM) codes by a scanner having (i) a housing that defines a cavity having a first portion and a second portion, the first portion of the cavity being further defined by one or more walls; (ii) a window positioned within the cavity, wherein the window separates the first portion of the cavity and the second portion of the cavity; (iii) a diffuser positioned within the first portion of the cavity, the diffuser configured to diffusingly reflect light that impinges thereon; (iv) an imaging assembly positioned within the second portion of the cavity and configured to capture light from an imaging field of view (FOV) extending through the window and the first portion of the cavity; (v) a first illumination assembly positioned within the second portion of the cavity and configured to emit a first illumination light towards the window; and (vi) an optical element configured to direct a first amount of a total amount of the first illumination light to exit the window and impinge on the diffuser, the method comprising:
    capturing a set of image data by the imaging assembly;
    detecting, by one or more processors, a direct part marking (DPM) code within the FOV of the imaging assembly; and
    decoding, by the one or more processors, the DPM code by analyzing a set of image data representative of the DPM code.

27. The method of claim 26, wherein the scanner further includes:
    a second illumination assembly positioned within the second portion of the cavity and configured to emit a second illumination light towards the window,
    wherein a ratio of (a) a first amount of a total amount of the second illumination light that exits the window and impinges on the diffuser and (b) a second amount of the total amount of the second illumination light that exits the window and passes through the first portion of the cavity without impinging on the one or more walls is less than or equal to 1:1.

28. The method of claim 27, wherein the capturing the set of image data comprises:
    activating, by the one or more processors, the first illumination assembly; and
    contemporaneous to activating the first illumination assembly, deactivating, by the one or more processors, the second illumination assembly.

29. The method of claim 27, further comprising:
    activating, by the one or more processors, the second illumination assembly;
    contemporaneous to activating the second illumination assembly, deactivating, by the one or more processors, the first illumination assembly;
    capturing a second set of image data by the imaging assembly;
    analyzing, by the one or more processors, the second set of image data to detect a presence of a feature of a printed barcode within the FOV of the imaging assembly; and
    decoding, by the one or more processors, the printed barcode by analyzing the second set of image data.

* * * * *